United States Patent
Zhu et al.

(10) Patent No.: US 12,149,444 B2
(45) Date of Patent: Nov. 19, 2024

(54) ROUTING RULE MANAGEMENT METHOD AND COMMUNICATIONS APPARATUS

(71) Applicant: Huawei Technologies Co., Ltd., Shenzhen (CN)

(72) Inventors: Qianghua Zhu, Beijing (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 17/521,096

(22) Filed: Nov. 8, 2021

(65) Prior Publication Data

US 2022/0060416 A1 Feb. 24, 2022

Related U.S. Application Data

(63) Continuation of application No. PCT/CN2020/088479, filed on Apr. 30, 2020.

(30) Foreign Application Priority Data

May 6, 2019 (CN) .......................... 201910372398.4

(51) Int. Cl.
*H04L 45/00* (2022.01)
*H04L 45/74* (2022.01)
(Continued)

(52) U.S. Cl.
CPC .............. *H04L 45/72* (2013.01); *H04L 45/74* (2013.01); *H04L 61/50* (2022.05);
(Continued)

(58) Field of Classification Search
CPC ..... H04L 45/72; H04L 61/50; H04L 61/5069; H04L 45/74; H04L 2101/622; G06N 20/00
(Continued)

(56) References Cited

U.S. PATENT DOCUMENTS 10,587,514 B1 * 3/2020 Singh .................... H04L 45/745
2020/0068385 A1 2/2020 Yu
(Continued)

FOREIGN PATENT DOCUMENTS

CN 108366380 A 8/2018
CN 109429363 A 3/2019
(Continued)

OTHER PUBLICATIONS

Nokia, et al., "5G LAN group communication with UPF autonomous traffic forwarding," SA WG2 Meeting #132 S2-1903312, Feb. 8-12, 2019, Xian, P.R. China, 8 pages.
(Continued)

*Primary Examiner* — Obaidul Huq
(74) *Attorney, Agent, or Firm* — Conley Rose, P.C.

(57) ABSTRACT

A routing rule management method and a communications apparatus, where after a first user plane function network element receives, through a protocol data unit (PDU) session, a first data packet, from a terminal, whose source address is a first address, the first user plane function network element generates a first routing rule corresponding to the PDU session when determining that the first address is an unknown media access control (MAC) address, and where the first routing rule is used to forward, to the PDU session, a data packet sent to the first address. After detecting the unknown MAC address, the first user plane function network element may generate a routing rule corresponding to the unknown MAC address without involvement of a session management function network element.

20 Claims, 14 Drawing Sheets

(51) Int. Cl.
  *H04L 61/50* (2022.01)
  *H04L 61/5069* (2022.01)
  *G06N 20/00* (2019.01)
  *H04L 101/622* (2022.01)

(52) U.S. Cl.
  CPC .......... *H04L 61/5069* (2022.05); *G06N 20/00* (2019.01); *H04L 2101/622* (2022.05)

(58) Field of Classification Search
  USPC ........................................ 370/351, 389, 392
  See application file for complete search history.

(56) References Cited

U.S. PATENT DOCUMENTS

| | | | |
|---|---|---|---|
| 2020/0127968 A1 | 4/2020 | Tang et al. | |
| 2020/0128087 A1 | 4/2020 | Yu et al. | |
| 2020/0228936 A1* | 7/2020 | Talebi Fard | .......... H04W 8/186 |
| 2020/0314686 A1* | 10/2020 | Godin | .................... H04W 24/08 |
| 2022/0182321 A1* | 6/2022 | Landais | .................. H04L 45/74 |

FOREIGN PATENT DOCUMENTS

| | | |
|---|---|---|
| CN | 109429370 A | 3/2019 |
| CN | 109548008 A | 3/2019 |
| EP | 3379870 A1 | 9/2018 |
| EP | 3468236 A1 | 4/2019 |
| WO | 2019033958 A1 | 2/2019 |

OTHER PUBLICATIONS

Nokia, et al., "Different types of Ethernet services and N4," SA WG2 Meeting #127, S2-184423, Apr. 16-20, 2018, Sanya, P.R. China, 7 pages.

3GPP TS 23.501 V16.0.2, Apr. 2019, "3rd Generation Partnership Project; Technical Specification Group Services and System Aspects; System Architecture for the 5G System; Stage 2 (Release 16)," 317 pages.

* cited by examiner

ROUTING RULE MANAGEMENT METHOD AND COMMUNICATIONS APPARATUS

CROSS-REFERENCE TO RELATED APPLICATIONS

This application is a continuation of International Patent Application No. PCT/CN2020/088479, filed on Apr. 30, 2020, which claims priority to Chinese Patent Application No. 201910372398.4, filed on May 6, 2019. The disclosures of the aforementioned applications are hereby incorporated by reference in their entireties.

TECHNICAL FIELD

This application relates to the field of communications technologies, and in particular, to a routing rule management method and a communications apparatus.

BACKGROUND

A 5th generation (5G) local area network (LAN) service is a service provided by a 5G system, and can provide Internet Protocol (IP)—type private communication or Ethernet-type private communication for terminals belonging to a same LAN group. For example, devices in a factory constitute a LAN group, and the devices belonging to the LAN group may send Ethernet data packets or IP data packets to each other.

In a 5G LAN (5GLAN), an Ethernet data packet is transmitted according to a routing rule configured by a user plane function (UPF) network element. When there is a data packet whose source address is an unknown media access control (MAC) address in an Ethernet-type session used to transmit the Ethernet data packet, the UPF network element needs to exchange a plurality of pieces of signaling with a session management function (SMF), to complete a process of setting a corresponding routing rule for the Ethernet data packet whose source address is the unknown MAC address.

Therefore, how to reduce signaling overheads between the SMF network element and the UPF network element when the routing rule is configured is an urgent problem to be resolved.

SUMMARY

Embodiments of this application provide a routing rule management method and a communications apparatus, to reduce signaling overheads between an SMF network element and a UPF network element when a routing rule is configured.

According to a first aspect, a routing rule management method is provided. In the method, after a first user plane function network element receives, through a protocol data unit (PDU) session, a first data packet, from a terminal, whose source address is a first address, the first user plane function network element generates a first routing rule corresponding to the PDU session when determining that the first address is an unknown MAC address, where the first routing rule is used to forward, to the PDU session, a data packet sent to the first address.

In the foregoing technical solution, after detecting the unknown MAC address, the first user plane function network element may generate a routing rule corresponding to the unknown MAC address without involvement of a session management function network element. Therefore, exchanged signaling between a session management function network element and a user plane function network element can be reduced when a routing rule is configured for an unknown MAC address in a conventional technology, and signaling overheads can be reduced.

In a possible design, the first routing rule includes a first packet detection rule (PDR) and/or a first forwarding action rule (FAR), the first PDR is used to detect the data packet sent to the first address, the first FAR includes tunnel information of the PDU session, and the tunnel information of the PDU session is set to tunnel information of the PDU session on an access network side or tunnel information of the PDU session on an intermediate user plane function network element side.

In the foregoing technical solution, the first user plane function network element may generate a corresponding routing rule based on a source of a data packet including an unknown MAC address. For example, when the user plane function network element receives, through a PDU session, the data packet including the unknown MAC address, tunnel information in an FAR may be set to tunnel information of the PDU session on the access network si. The foregoing generated routing rule is merely an example, and specific content of the generated routing rule is not limited in this application.

In a possible design, the first FAR further includes a quality of service (QoS) flow identifier (QFI), and the QFI is set to a QFI of a quality of service flow to which the first data packet belongs.

In a possible design, after generating the first routing rule, the first user plane function network element may generate a second data packet and MAC address self-learning indication information, where a source address of the second data packet is the first address, and where a destination address of the second data packet is a broadcast address or a multicast address. Then, the first user plane function network element forwards the second data packet and the MAC address self-learning indication information to an internal interface of the first user plane function network element.

Alternatively, in a possible design, after generating the first routing rule, the first user plane function network element may generate a second data packet, where a source address of the second data packet is the first address, where a destination address of the second data packet is a broadcast address or a multicast address, where the second data packet includes a virtual local area network (VLAN) tag, and where the VLAN tag is used to indicate that the second data packet is used for MAC address self-learning. Then, the first user plane function network element may forward the second data packet to an internal interface of the first user plane function network element.

In the foregoing technical solution, after receiving the data packet including the unknown MAC address, the first user plane function network element may generate the second data packet used to learn the unknown MAC address, and forward the second data packet through the internal interface. As such, the first user plane function network element matches the second data packet with a PDR, and then self-learns the unknown MAC address again. In addition, there may be, but is not limited to, the foregoing two manners for the second data packet, which may increase flexibility of the solution.

In a possible design, after receiving the second data packet through the internal interface of the first user plane function network element, the first user plane function network element determines that a source address of the second data is an unknown MAC address, and generates, in a fourth N4 session corresponding to a PDR matching the second data packet, a third routing rule corresponding to the unknown MAC address, where the third routing rule is used to forward, to the internal interface, a data packet sent to the unknown MAC address.

In the foregoing technical solution, after receiving, through the internal interface, the second data packet including the unknown MAC address, the first user plane function network element may match the second data packet with a PDR again, and then self-learn the unknown MAC address again. For example, the second data packet may be matched with a PDR corresponding to a group-level N4 session, such that the unknown MAC address is self-learned in the group-level N4 session.

In a possible design, the third routing rule includes a third PDR and/or a third FAR, the third PDR is used to detect the data packet sent to the unknown MAC address. Additionally, a destination port parameter of the third FAR is set to an interface value corresponding to the internal interface.

In a possible design, after receiving the second data packet through the internal interface of the first user plane function network element, the first user plane function network element may replicate the second data packet, and then send a replicated data packet and the MAC address self-learning indication information to at least one other user plane function network element. Then, after the at least one other user plane function network element, for example, a second user plane function network element, receives the data packet from the terminal and the MAC address self-learning indication information through a tunnel between the first user plane function network element and the second user plane function network element, when the first address is an unknown MAC address, the second user plane function network element generates, based on the MAC address self-learning indication information, a second routing rule corresponding to a third N3 session, where the second routing rule is used to forward, to the tunnel, the data packet sent to the first address, and the third N4 session is an N4 session of a 5G local area network (LAN) group to which the terminal belongs on the second user plane function network element.

In the foregoing technical solution, the first user plane function network element may replicate and forward the data packet to the second user plane function network element, such that the second user plane function network element also generates, in a corresponding N4 session, a routing rule corresponding to the unknown MAC address, such that information synchronization of a plurality of user plane function network elements can be ensured.

In a possible design, the second routing rule includes a second PDR used to detect the data packet sent to the first address and/or a second forwarding action rule FAR including a destination port parameter and/or an external tunnel parameter, where the destination port parameter is set to an interface value corresponding to the tunnel, and a value of the external tunnel parameter is set to tunnel information of the tunnel.

The foregoing generated routing rule is merely an example, and specific content of the generated routing rule is not limited in this application.

In this embodiment of this application, manners in which the first user plane function network element replicates the second data packet, and sends the replicated data packet and the MAC address self-learning indication information to the at least one other user plane function network element may include but are not limited to the following two manners.

In a first manner, the first user plane function network element may replicate the second data packet based on a replication label, in the second FAR associated with the second PDR matching the second data packet, used to replicate the data packet. If the second FAR further includes a forwarding indication, for example, the forwarding indication includes information about a tunnel between the first user plane function network element and the at least one other user plane function network element, the first user plane function network element may send, based on the forwarding indication, the replicated data packet to the at least one other user plane function network element.

In a second manner, after determining that the source address of the second data packet is the unknown MAC address, the first user plane function network element automatically replicates the second data packet. Then, after determining that the source address of the second data packet is the unknown MAC address, the first user plane function network element determines information about a tunnel between the first user plane function network element and each of the at least one other user plane function network element based on an external tunnel associated with an N4 session of the 5G LAN group to which the terminal belongs, and sends the replicated data packet to the at least one other user plane function network element based on the determined information about the tunnel.

The foregoing manners of replicating the data packet and the foregoing manners of forwarding the data packet are merely used as examples for description, and are not limited in this embodiment of this application.

In a possible design, the MAC address self-learning indication information is further used to indicate each of the at least one other user plane function network element to learn a source address in the replicated data packet and then discard the replicated data packet. Additionally, the MAC address self-learning indication information is included in tunnel header information of the replicated data packet.

In the foregoing technical solution, if a destination address of the data packet is not a MAC address of a terminal device connected to each of the at least one other user plane function network element or a MAC address of an end device connected to a terminal device, the first user plane function network element may use the MAC address self-learning indication information to indicate each of the at least one other user plane function network element to discard the replicated data packet. In this way, after receiving the second data packet, the at least one other user plane function network element, for example, the second user plane function network element, does not forward the second data packet, such that the terminal device or the end device does not repeatedly receive the data packet. In addition, a first indication is carried in the tunnel header information of the replicated data packet, such that exchanged signaling between the first user plane function network element and the at least one other user plane function network element can be reduced, and signaling overheads can be reduced.

In a possible design, the session management function network element receives a PDU session creation request for the terminal, then determines, based on a data network name (DNN) carried in the PDU session creation request, that the DNN is associated with a 5G LAN group, and finally, sends, to a user plane function network element anchored by the PDU session, the first indication used to indicate the user plane function network element to perform MAC address self-learning or used to activate a MAC address self-learning function of the user plane function network element. After receiving the first indication, the first user plane function network element and the second user plane function network element each enable an unknown MAC address self-learning function.

In the foregoing technical solution, the first user plane function network element and the second user plane function network element may self-learn the unknown MAC address based on the indication of the session management function network element. To be more specific, the first user plane function network element or the second user plane function network element generates a routing rule corresponding to the detected unknown MAC address only after the session management function network element indicates the first user plane function network element or the second user plane function network element to enable the unknown MAC address self-learning function. The first user plane function network element and the second user plane function network element do not generate a routing rule of the unknown MAC address if the session management function network element does not indicate the first user plane function network element or the second user plane function network element to enable the unknown MAC address self-learning function. Therefore, load of the first user plane function network element and load of the second user plane function network element can be reduced.

In a possible design, the session management function network element generates the first indication based on a local configuration and/or group policy information determined and sent by a policy control function network element, where the group policy information is unknown MAC address self-learning policy information, and where the local configuration is used to indicate a user plane function network element to perform MAC address self-learning.

In the foregoing technical solution, the session management function network element may generate the first indication in a plurality of manners, to increase flexibility of the session management function network element.

In a possible design, when the anchored user plane function network element provides a service for the 5GLAN group for the first time, the session management function network element sends an N4 session creation request corresponding to the 5GLAN group to the anchored user plane function network element.

In a possible design, the session management function network element may further send an N4 session creation request corresponding to the PDU session to the anchored user plane function network element.

In a possible design, the first indication is carried in the N4 session creation request corresponding to the 5GLAN group and/or the N4 session creation request corresponding to the PDU session.

In the foregoing technical solution, the first indication is carried in the N4 session creation request, such that exchanged signaling between the user plane function network element and the session management function network element can be reduced, and signaling overheads can be reduced.

According to a second aspect, a communications system is provided. The communications system includes a first user plane function network element and a session management function network element.

The session management function network element is configured to: generate a first indication based on a local configuration and/or group policy information that is received from a policy control function network element, where the first indication is used to indicate a user plane function network element to self-learn a MAC address, or is used to activate a MAC address self-learning function of a user plane function network element; and send the first indication to the first user plane function network element.

The first user plane function network element is configured to: receive the first indication; and after receiving, through a PDU session, a first data packet, from a terminal, whose source address is a first address, generate a first routing rule corresponding to the PDU session when the first address is an unknown MAC address, where the first routing rule is used to forward, to the PDU session, a data packet sent to the first address.

In a possible design, the first routing rule includes a first PDR and/or a first FAR, the first PDR is used to detect the data packet sent to the first address, the first FAR includes tunnel information of the PDU session, and the tunnel information of the PDU session is set to tunnel information of the PDU session on an access network side or tunnel information of the PDU session on an intermediate user plane function network element side.

In a possible design, the first FAR further includes a QFI, and the QFI is set to a QFI of a QoS flow to which the first data packet belongs.

In a possible design, the first user plane function network element is further configured to: generate a second data packet, where a source address of the second data packet is the first address, and a destination address of the second data packet is a broadcast address or a multicast address; and forward the second data packet and MAC address self-learning indication information to an internal interface of the first user plane function network element.

In a possible design, the first user plane function network element is further configured to: receive the second data packet and the MAC address self-learning indication information through the internal interface of the first user plane function network element; and replicate the second data packet; and send a replicated data packet and the MAC address self-learning indication information to at least one other user plane function network element.

In a possible design, the first user plane function network element is further configured to: determine a second FAR associated with a second PDR matching the second data packet, where the second FAR includes a replication label; and replicate the second data packet based on the replication label.

If the second FAR further includes a forwarding indication, and the forwarding indication includes information about a tunnel between the first user plane function network element and each of the at least one other user plane function network element, the first user plane function network element is further configured to send the replicated data packet to each of the at least one other user plane function network element based on the forwarding indication.

In a possible design, the first user plane function network element is further configured to: replicate the second data packet after determining that the source address of the second data packet is an unknown MAC address; after determining that the source address of the second data packet is the unknown MAC address, obtain the second FAR associated with the second PDR matching the second data packet; determine the information about the tunnel between the first user plane function network element and each of the at least one other user plane function network element based on an external tunnel parameter in the second FAR; and send the replicated data packet to each of the at least one other user plane function network element based on the determined information about the tunnel.

In a possible design, the MAC address self-learning indication information is further used to indicate each of the at least one other user plane function network element to learn a source address in the replicated data packet and then discard the replicated data packet. Additionally, the MAC address self-learning indication information is included in tunnel header information of the replicated data packet.

In a possible design, the first user plane function network element is further configured to: receive the first indication from the session management function network element, where the first indication is used to indicate the first user plane function network element to self-learn the unknown MAC address, or where the first indication is used to activate an unknown MAC address self-learning function of the first user plane function network element.

In a possible design, the first indication is carried in a creation request of a first N4 session and/or a creation request of a second N4 session, the first N4 session is an N4 session corresponding to the PDU session, and the second N4 session is the N4 session of the 5GLAN group to which the terminal belongs on the first user plane function network element.

In a possible design, the session management function network element is configured to: receive a PDU session creation request for the terminal, where the PDU session creation request includes a DNN; determine that the DNN is associated with a 5G LAN group; and send the first indication to a user plane function network element anchored by the PDU session, where the first indication is used to indicate the user plane function network element to self-learn the MAC address, or is used to activate a MAC address self-learning function of the user plane function network element.

In a possible design, the session management function network element is further configured to: generate the first indication based on the local configuration and/or the group policy information that is received from the policy control function network element, where the group policy information is unknown MAC address self-learning policy information, and where the local configuration is used to indicate the user plane function network element to perform MAC address self-learning.

In a possible design, when the anchored user plane function network element provides a service for the 5GLAN group for the first time, the session management function network element is further configured to send an N4 session creation request corresponding to the 5GLAN group to the anchored user plane function network element.

In a possible design, the session management function network element is further configured to send an N4 session creation request corresponding to the PDU session to the anchored user plane function network element.

In a possible design, the first indication is carried in the N4 session creation request corresponding to the 5GLAN group and/or the N4 session creation request corresponding to the PDU session.

In a possible design, the communications system further includes a second user plane function network element, and the second user plane function network element is configured to: receive, through a tunnel between the first user plane function network element and the second user plane function network element, a data packet and the MAC address self-learning indication information from the first user plane function network element, where a source address of the data packet is the first address; and when the first address is an unknown MAC address, generate, based on the MAC address self-learning indication information, a second routing rule corresponding to a third N4 session, where the second routing rule is used to forward, to the tunnel, the data packet sent to the first address, and where the third N4 session is an N4 session corresponding to the tunnel.

In a possible design, the second routing rule includes a second PDR and/or a second forwarding action rule FAR, the second PDR is used to detect the data packet sent to the first address, the second FAR includes a destination port parameter and/or an external tunnel parameter, the destination port parameter is set to an interface value corresponding to the tunnel, and a value of the external tunnel parameter is set to tunnel information of the tunnel.

In a possible design, the MAC address self-learning indication information is further used to indicate the second user plane function network element to learn a source address in the replicated data packet and then discard the replicated data packet. Additionally, the MAC address self-learning indication information is included in tunnel header information of the data packet.

In a possible design, the second user plane function network element is further configured to: receive a first indication from the session management function network element, where the first indication is used to indicate the second user plane function network element to self-learn the unknown MAC address, or where the first indication is used to activate an unknown MAC address self-learning function of the second user plane function network element.

In a possible design, the first indication is carried in a creation request of the third N4 session.

In a possible design, the communications system further includes the policy control function network element, and the policy control function network element is configured to: determine group policy information, where the group policy information is unknown MAC address self-learning policy information; and send the group policy information to the session management function network element.

According to a third aspect, a communications apparatus is provided. The communications apparatus includes a processor configured to implement the method performed by the first user plane function network element in the first aspect. The communications apparatus may further include a memory configured to store program instructions and data. The memory is coupled to the processor. The processor may invoke and execute the program instructions stored in the memory, to implement any method performed by the first user plane function network element in the first aspect. The communications apparatus may further include a transceiver, and the transceiver is configured to perform communication between the communications apparatus and another device. For example, the other device is a second user plane function network element.

According to a fourth aspect, an embodiment of this application provides a communications apparatus, including: a transceiver unit configured to receive a first data packet from a terminal through a PDU session, where a source address of the first data packet is a first address; and a processing unit configured such that when the first address is an unknown MAC address, the processing unit generates a first routing rule corresponding to the PDU session, where the first routing rule is used to forward, to the PDU session, a data packet sent to the first address.

In addition, the communications apparatus provided in the third aspect may be configured to perform the method corresponding to the first user plane function network element in the first aspect. For an implementation that is not described in detail in the communications apparatus provided in the third aspect, refer to the foregoing embodiments. Details are not described herein again.

According to a fifth aspect, a communications apparatus is provided. The communications apparatus includes a processor configured to implement the method performed by the second user plane function network element in the first aspect. The communications apparatus may further include a memory configured to store program instructions and data. The memory is coupled to the processor. The processor may invoke and execute the program instructions stored in the memory, to implement any method performed by the second user plane function network element in the first aspect. The communications apparatus may further include a transceiver, and the transceiver is configured to perform communication between the communications apparatus and another device. For example, the other device is a first user plane function network element.

According to a sixth aspect, an embodiment of this application provides a communications apparatus, including: a transceiver unit configured to receive, through a tunnel between a first user plane function network element and the second user plane function network element, a data packet and MAC address self-learning indication information from a terminal, where a source address of the data packet is a first address; and a processing unit configured such that when the first address is an unknown MAC address, the processing unit generates, based on the MAC address self-learning indication information, a second routing rule corresponding to a third N3 session, where the second routing rule is used to forward, to the tunnel, a data packet sent to the first address, and where the third N4 session is an N4 session of a 5G LAN group to which the terminal belongs on the second user plane function network element.

In addition, the communications apparatus provided in the fifth aspect may be configured to perform the method corresponding to the second user plane function network element in the first aspect. For an implementation that is not described in detail in the communications apparatus provided in the fifth aspect, refer to the foregoing embodiments. Details are not described herein again.

According to a seventh aspect, a communications apparatus is provided. The communications apparatus includes a processor configured to implement the method performed by the session management function network element in the first aspect. The communications apparatus may further include a memory configured to store program instructions and data. The memory is coupled to the processor. The processor may invoke and execute the program instructions stored in the memory, to implement any method performed by the session management function network element in the first aspect. The communications apparatus may further include a transceiver, and the transceiver is configured to perform communication between the communications apparatus and another device. For example, the other device is a first user plane function network element.

According to an eighth aspect, an embodiment of this application provides a communications apparatus, including a processing unit configured to: generate a first indication and/or a second indication based on a local configuration and/or group policy information that is received from a policy control function network element, where the first indication is used to indicate a first user plane function network element to self-learn an unknown MAC address; or configured to activate an unknown MAC address self-learning function of a first user plane function network element, where the second indication is used to indicate a second user plane function network element to self-learn an unknown MAC address, or configured to activate an unknown MAC address self-learning function of a second user plane function network element. The communications apparatus further includes a transceiver unit configured to send the first indication to the first user plane function network element, and/or send the second indication to the second user plane function network element.

In addition, the communications apparatus provided in the eighth aspect may be configured to perform the method corresponding to the session management function network element in the first aspect. For an implementation that is not described in detail in the communications apparatus provided in the eighth aspect, refer to the foregoing embodiments. Details are not described herein again.

According to a ninth aspect, a communications apparatus is provided. The communications apparatus includes a processor configured to implement the method performed by the policy control function network element in the first aspect. The communications apparatus may further include a memory configured to store program instructions and data. The memory is coupled to the processor. The processor may invoke and execute the program instructions stored in the memory, to implement any method performed by the policy control function network element in the first aspect. The communications apparatus may further include a transceiver, and the transceiver is configured to perform communication between the communications apparatus and another device. For example, the other device is a session management function network element.

According to a tenth aspect, an embodiment of this application provides a communications apparatus, including: a processing unit configured to determine group policy information, where the group policy information is unknown MAC address self-learning policy information; and a transceiver unit configured to send the group policy information to a session management function network element.

According to an eleventh aspect, an embodiment of this application further provides a computer-readable storage medium, including instructions. When the instructions are run on a computer, the computer is enabled to perform the method performed by the first user plane function network element, the second user plane function network element, the session management function network element, or the policy control function network element in the first aspect.

According to a twelfth aspect, an embodiment of this application further provides a computer program product, including instructions. When the instructions are run on a computer, the computer is enabled to perform the method performed by the first user plane function network element, the second user plane function network element, the session management function network element, or the policy control function network element in the first aspect.

According to a thirteenth aspect, an embodiment of this application provides a chip system. The chip system includes a processor, and may further include a memory configured to implement the method performed by the first user plane function network element, the second user plane function network element, the session management function network element, or the policy control function network element in the first aspect. The chip system may include a chip, or may include a chip and another discrete component.

According to a fourteenth aspect, an embodiment of this application provides a communications system. The system includes the communications apparatuses in the third aspect and the seventh aspect, or includes the communications apparatuses in the fourth aspect and the eighth aspect.

In a possible design, the communications system further includes the communications apparatus in the fifth aspect or the sixth aspect.

In a possible design, the communications system further includes the communications apparatus in the ninth aspect or the tenth aspect.

For beneficial effects of the second aspect to the fourteenth aspect and implementations thereof, refer to the descriptions of beneficial effects of the method in the first aspect and implementations thereof.

DESCRIPTION OF EMBODIMENTS

To make objectives, technical solutions, and advantages of embodiments of this application clearer, the following describes the technical solutions in the embodiments of this application in detail with reference to the accompanying drawings and example implementations of the specification.

Figure 1:
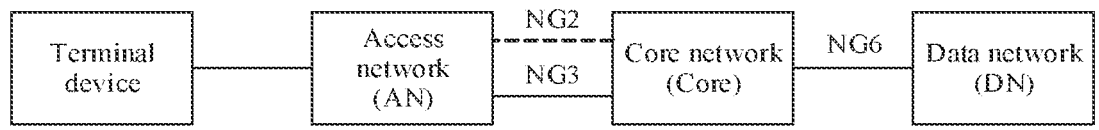
FIG. 1 is a diagram of an example of a network architecture of a communications system to which this application is applicable.

FIG. 1 is a diagram of an example of a network architecture of a communications system to which this application is applicable. Network elements in the network architecture include a terminal, an access network (AN), a core network (Core), and a data network (DN). The access network may be a radio access network (RAN). In the network architecture, the terminal, the AN, and the core are main parts of the network architecture. Network elements in the AN and the core may be logically divided into two parts: a user plane and a control plane. The control plane is responsible for managing a mobile network, and the user plane is responsible for transmitting service data. For example, in the network architecture shown in FIG. 1, an NG2 reference point is located between a RAN control plane and a core control plane, an NG3 reference point is located between a RAN user plane and a core user plane, and an NG6 reference point is located between the core user plane and the DN.

In the network architecture shown in FIG. 1, the terminal is also referred to as a terminal device (or terminal equipment), a user equipment (UE), a mobile station (MS), a mobile terminal (MT), or the like. The terminal is a device having a wireless transceiver function, and is an interface used by a mobile user to interact with a network. The terminal can provide a basic computing capability and a storage capability, display a service window to the user, and receive an operation input of the user. In a 5G communications system, the terminal establishes a signal connection and a data connection to the AN using a new radio technology, to transmit a control signal and service data to a network.

The terminal may be deployed on land, including an indoor device, an outdoor device, a handheld device, or a vehicle-mounted device; or may be deployed on water (for example, on a ship), or may be deployed in the air (for example, on a plane, a balloon, or a satellite). For example, the terminal may include a mobile phone (which is also referred to as a "cellular" phone), a computer with a mobile terminal, a portable, pocket-sized, handheld, computer built-in, or in-vehicle mobile apparatus, and an intelligent wearable device. For example, the terminal may include a device such as a personal communications service (PCS) phone, a cordless telephone set, a Session Initiation Protocol (SIP) phone, a wireless local loop (WLL) station, or a personal digital assistant (PDA).

Alternatively, the terminal may further include a limited device, for example, a device with low power consumption, a device with a limited storage capability, or a device with a limited computing capability. For example, the terminal includes an information sensing device, for example, a barcode, radio frequency identification (RFID), a sensor, a Global Positioning System (GPS), or a laser scanner.

By way of example and not limitation, in this embodiment of this application, an intelligent wearable device is a generic term for wearable devices such as glasses, gloves, watches, clothes, and shoes that are developed based on intelligent design of daily wearing using wearable technologies. The intelligent wearable device is a portable device that can be directly worn by a user or integrated into clothes or an accessory of a user. The intelligent wearable device is not only a hardware device, but is used to implement powerful functions through software support, data exchange, and cloud interaction. In a broad sense, the intelligent wearable device includes full-featured and large-sized devices that can implement all or some functions without depending on smartphones, for example, smartwatches or smart glasses, and devices that focus on only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control (industrial control), a wireless terminal in self driving (driverless), a wireless terminal in remote medical surgery, a wireless terminal in a smart grid, a wireless terminal in transportation safety, a wireless terminal in a smart city, a wireless terminal in a smart home, or the like.

In the network architecture shown in FIG. 1, the AN is similar to a (radio) access network ((radio) access network, (R)AN) device in a conventional communications network. For example, the AN includes a base station (for example, an access point), is deployed at a location close to a terminal, provides a network access function for an authorized user in a specific area, and can determine transmission tunnels of different quality to transmit user data based on a user level, a service requirement, and the like. The AN can manage and properly use a resource of the AN, provide an access service for a terminal on demand, and is responsible for forwarding a control signal and service data between the terminal and the core.

In the network architecture shown in FIG. 1, the core is responsible for maintaining subscription data of a mobile network, managing a network element in the mobile network, and providing functions such as session management, mobility management, policy management, and security authentication for the terminal. For example, the core provides network access authentication for the terminal when the terminal attaches to a network; the core allocates a network resource to the terminal when the terminal has a service request; the core updates a network resource for the terminal when the terminal moves; the core provides a fast recovery mechanism for the terminal when the terminal is idle; the core releases a network resource for the terminal when the terminal detaches from a network; the core provides a data routing function for the terminal when the terminal has service data, for example, the core forwards uplink data to the DN or receives downlink data from the DN and forwards the downlink data to the AN.

In the network architecture shown in FIG. 1, the DN is a data network that provides a service for a user. In an actual communications process, a client is usually located on the terminal, and a server is usually located in the DN. The DN may be a private network, for example, a local area network, or may be an external network that is not controlled by an operator, for example, the Internet, or may be a dedicated network jointly deployed by operators, for example, a network that provides an IP multimedia network subsystem (IP multimedia core network subsystem (IMS)) service.

Figure 2:
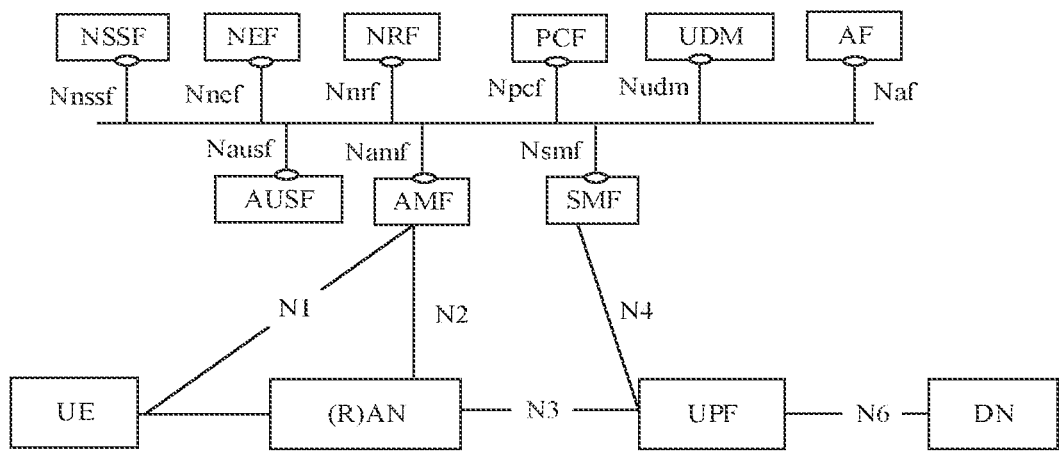
FIG. 2 is a schematic diagram of a network architecture to which this application is applicable.

FIG. 2 is a schematic diagram of a network architecture to which this application is applicable. The network architecture is a 5G network architecture. Network elements in the 5G architecture include a terminal, a radio access network (RAN), and a data network (DN). In FIG. 2, an example in which the terminal is a user equipment (UE) is used. In addition, the network architecture further includes a core network element, and the core network element includes a UPF network element and a control plane function network element. For example, control plane function network elements include but are not limited to an access and mobility management function (AMF) network element, an SMF network element, an authentication server function (AUSF) network element, an application function (AF) network element, a unified data management (UDM) network element, a policy control function (PCF) network element, a network exposure function (NEF) network element, a network function (NF) repository function (NRF) network element, and a network slice selection function (NSSF) network element.

It should be noted that, in a conventional core network architecture, a point-to-point communication mode is used between control plane function network elements, that is, a set of specific messages is used for interface communication between control plane function network elements, and the control plane function network elements at both ends of an interface can communicate with each other only using the set of specific messages. However, in a 5G core network architecture, a service-based architecture is used for a control plane, that is, a service invoking mode is used for interaction between control plane function network elements, and a control plane function network element opens a service to another control plane function network element for the other control plane function network element to invoke.

Functions of the network elements in the network architecture shown in FIG. 2 are described in detail below. Because functions of the UE, the (R)AN, and the DN have been described in related descriptions of the network architecture shown in FIG. 1, the following mainly describes functions of the core network elements.

The UPF network element is a function network element on a user plane, and is mainly responsible for connecting to an external network. The UPF network element performs related functions of a serving gateway (SGW) and a packet data network (PDN) gateway (PDN-GW) in Long-Term Evolution (LTE). For example, the UPF may forward a user data packet according to a routing rule of the SMF, for example, send uplink data to the DN or another UPF, or forward downlink data to another UPF or the RAN.

The AMF network element is responsible for access management and mobility management of the UE, for example, responsible for maintaining a UE status, managing reachability of the UE, forwarding a mobility management (MM) non-access-stratum (NAS) message, and forwarding a session management (SM) N2 message. During actual application, the AMF network element may implement a mobility management entity (MME) function of an MME in an LTE network framework, and may further implement an access management function.

The SMF network element is responsible for session management, and allocates a resource or releases a resource for a session of the UE. The resource includes session quality of service (QoS), a session path, a routing rule, and the like.

The AUSF network element is configured to perform security authentication of the UE.

The AF network element may be a third-party application control platform, or may be a device deployed by an operator. The AF network element may provide services for a plurality of application servers.

The UDM network element may store subscription information of the UE.

The PCF network element is configured to perform user policy management, and is similar to a policy and charging rules function (PCRF) network element in LTE. The PCF network element is mainly responsible for policy authorization, quality of service, and generation of a charging rule, generates a routing rule using a corresponding rule through the SMF network element, delivers the routing rule to the UPF network element, and completes installation of the corresponding policy and rule.

The NEF network element is configured to expose a network function to a third party in a northbound application programming interface (API) manner.

The NRF network element is configured to provide, for another network element, a function of storing and selecting network function entity information.

The NSSF network element is configured to select a network slice for the UE.

In the network architecture shown in FIG. 2, the SMF network element is further configured to manage local area network communication on the UE in a group.

In the network architecture shown in FIG. 2, network elements related to this application mainly include UE, a PCF, a UPF, and an SMF.

The following describes an application scenario in this application. This application is mainly applied to a scenario in which a 5G system provides a 5GLAN service.

Figure 3A:
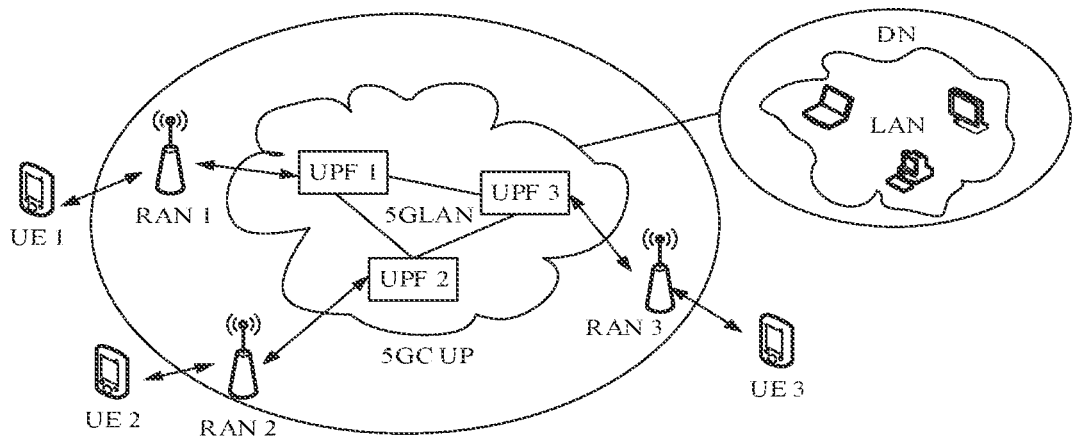
FIG. 3A is a schematic diagram of an example of an application scenario according to an embodiment of this application.

FIG. 3A is a schematic diagram of an example of a user plane architecture of a 5GLAN service according to this application. A UPF 1 to a UPF 3 belong to a 5GLAN. UE 1 to UE 3 are separately connected to one UPF network element in the 5GLAN through one RAN. For example, the UE 1 is connected to a UPF 1, the UE 2 is connected to a UPF 2, and the UE 3 is connected to a UPF 3. Therefore, the UE 1 to the UE 3 access a user plane (UP) of the corresponding 5GLAN through the UPF network element. For example, the UE 1 to the UE 3 access a 5GC UP through the UPF 1 to the UPF 3 respectively, and the UE 1 to the UE 3 are a 5G virtual network (VN) group. One UE is located in one 5GLAN (alternatively, it may be understood that one UE belongs to one 5GLAN or one 5GLAN service, or the UE subscribes to one 5GLAN or one 5GLAN service, or the UE is associated with or corresponds to one 5GLAN or one 5GLAN service). The user plane of the 5GLAN can communicate with an existing LAN in a DN through an N6 interface. Alternatively, the user plane of the 5GLAN may be associated with protocol data unit (PDU) sessions of different UEs through N19 connections between UPFs (for example, the UPF 1 to the UPF 3) in the 5GLAN, to implement private communication between UEs.

Figure 3B:
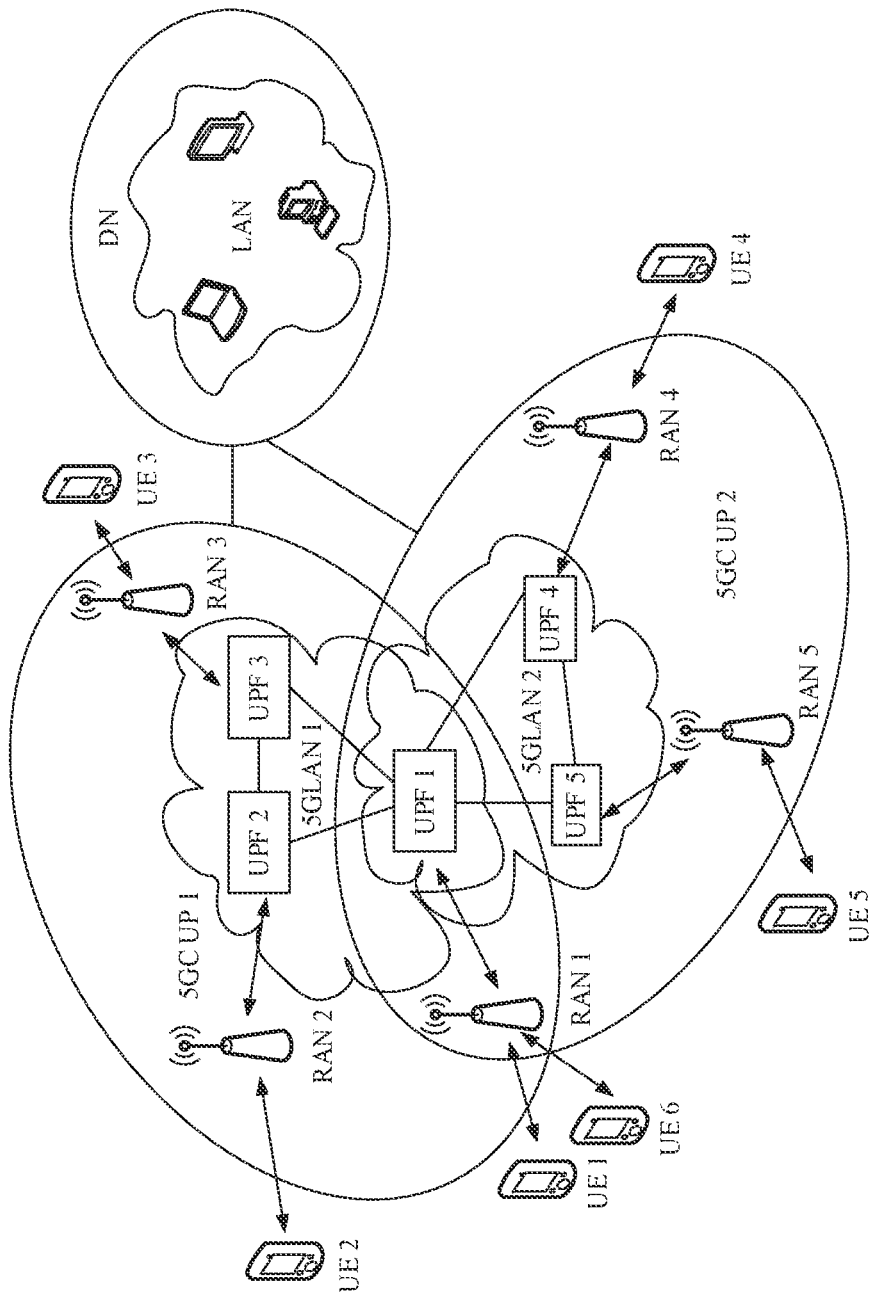
FIG. 3B is a schematic diagram of another example of an application scenario according to an embodiment of this application.

FIG. 3B is a schematic diagram of another example of a user plane architecture of a 5GLAN service according to this application. Different from FIG. 3A, in FIG. 3B, the user plane architecture of the 5GLAN service includes a plurality of different 5GLANs. For example, a UPF 1, a UPF 2, and a UPF 3 belong to one 5GLAN marked as a 5GLAN 1, and the UPF 1, a UPF 4, and a UPF 5 belong to another 5GLAN marked as a 5GLAN 2. A plurality of UEs are respectively connected to user planes of different 5GLANs. UE 1 and UE 6 are connected to the UPF 1, UE 2 is connected to the UPF 2, UE3 is connected to the UPF 3, UE 4 is connected to the UPF 4, and UE 5 is connected to the UPF 5. The UE 1, the UE 2, the UE 3, and the UE 6 access a user plane of the 5GLAN 1 marked as a 5GC UP 1, and the UE 1, the UE 2, the UE 3, and the UE 6 are a 5G VN group marked as a group 1. The UE 1, the UE 4, and the UE 5 access a user plane corresponding to the 5GLAN 2 marked as a 5GC UP 2, and the UE 1, the UE 4, and the UE 5 are another 5G VN group marked as a group 2. Same UE may be located in different 5GLANs. For example, the UE 1 is separately located in the group 1 and the group 2.

A quantity of UPFs and a quantity of UEs in FIG. 3A and FIG. 3B are merely examples. During actual application, the user plane architectures of the 5GLAN service provided in this application may provide services for more terminals, and may include more UPFs. In addition, in the user plane architectures of the 5GLAN service shown in FIG. 3A and FIG. 3B, although the UPF, the UE, and the DN are shown, the user plane architectures of the 5GLAN service may not be limited to including the foregoing content. For example, the user plane architecture of the 5GLAN service may further include an SMF network element, a PCF network element, a device configured to bear a virtualized network function, a wireless relay device, and the like. These are understood for a person skilled in the art. Details are not described herein.

The 5GLAN in this application may be alternatively replaced with a 5GLAN-type service, a 5GLAN-VN, a 5G VN, or the like.

To help a person skilled in the art understand the solutions in the embodiments of this application, the following describes technical terms in this application.

(1) An N4 session includes a UE-level N4 session and a group-level N4 session.

The N4 session is created by an SMF network element on a UPF network element.

For example, when creating a PDU session of a UE, the SMF network element may indicate the UPF network element to create an N4 session corresponding to the PDU session, which may also be referred to as the UE-level N4 session (in this application, the UE-level N4 session and the N4 session corresponding to the PDU session is used interchangeably). For example, in FIG. 3B, the UE 1 and the UE 6 are connected to the UPF 1 through the RAN 1, and then the SMF may indicate the UPF 1 to create an N4 session corresponding to a PDU session of the UE 1 when creating the PDU session of the UE 1, and the SMF may indicate the UPF 1 to create an N4 session corresponding to a PDU session of the UE 6 when creating the PDU session of the UE 6. A routing rule in the UE-level N4 session may be used to detect and forward data related to the UE. When receiving a request for deleting the PDU session of the UE, the SMF triggers the UPF network element to delete the N4 session corresponding to the PDU session.

For ease of description, the N4 session corresponding to the PDU session is distinguished below using an "identifier of the UE". For example, the N4 session corresponding to the PDU session of the UE 1 may be referred to as an N4 session of the UE 1, the N4 session corresponding to the PDU session of the UE 6 may be referred to as an N4 session of the UE 6, and so on.

To support communication between different UPF network elements and communication between a UPF network element and a DN in a 5GLAN service, the SMF network element further needs to create a group-level N4 session for a corresponding 5G VN group (or 5GLAN) on each UPF network element that provides a 5GLAN service. A routing rule in the group-level N4 session is used to detect data of any UE in the 5G VN group (which may be understood as data that belongs to the 5G VN group) and forward the data that belongs to the 5G VN group, where forwarding the data that belongs to the 5G VN group may include forwarding the data across UPF network elements (different UPF network elements in a 5GLAN group), forwarding the data through an N6 tunnel, or locally forwarding the data. In this application, an N4 session corresponding to a group and an N4 session corresponding to a tunnel may be understood as group-level N4 sessions. For example, in FIG. 3A, the UE 1 to the UE 3 belong to one 5GLAN, and the SMF network element creates a group-level N4 session for the 5GLAN on each UPF network element. FIG. 3B includes two 5GLANs, which are respectively the 5GLAN 1 and the 5GLAN 2. The SMF network element creates a group-level N4 session corresponding to the 5GLAN 1 on a UPF network element corresponding to the 5GLAN 1, where the group-level N4 session corresponding to the 5GLAN 1 may be marked as an N4 session of the group 1; and the SMF network element creates a group-level N4 session corresponding to the 5GLAN 2 on a UPF network element corresponding to the 5GLAN 2, where the group-level N4 session corresponding to the 5GLAN 2 may be marked as an N4 session of the group 2. The SMF network element creates a group-level N4 session corresponding to the 5GLAN when creating the first PDU session established to the 5GLAN, and deletes a group-level N4 session corresponding to the 5GLAN when releasing the last PDU session to the 5GLAN.

One UPF network element may include one or more N4 sessions corresponding to one or more PDU sessions. For example, a plurality of UEs are connected to a same UPF network element, and in this case, an N4 session corresponding to a PDU session of each UE needs to be created on the UPF network element. In addition, one UPF network element may include one or more group-level N4 sessions. For example, in FIG. 3B, the UE 1, the UE 2, the UE 3, and the UE 6 form a 5G VN group, and the UE 1, the UE 4, and the UE 5 form another 5G VN group. In this case, two group-level N4 sessions need to be created on the UPF 1, that is, an N4 session of the group 1 and an N4 session of the group 2. A quantity of N4 sessions is not limited in this application.

(2) A routing rule is used to detect a data packet and forward a data packet in a context of an N4 session, and includes an uplink (UL) packet detection rule (UL PDR), an uplink forwarding action rule (UL FAR) associated with the UL PDR, a downlink (DL) packet detection rule (DL PDR), and a DL FAR associated with the DL PDR. The PDRs (the UL PDR and the DL PDR) are used to detect data that is transmitted to a UPF network element from a PDU session tunnel or data that is forwarded through an internal interface of a UPF network element, and the FARs (the UL FAR and the DL FAR) are used to indicate the UPF network element to perform actions such as forwarding, replication, buffering, discarding, and notification for the detected data. When indicating the UPF to create an N4 session, the SMF network element configures a corresponding routing rule for the N4 session. The data transmitted from the PDU session tunnel may be understood as data received by the UPF network element through a PDU session.

For the N4 session corresponding to the PDU session, the UL PDR includes a source interface parameter, a tunnel information parameter, and an Ethernet filter parameter or Ethernet PDU session information (a MAC address of UE).

The UL FAR associated with the UL PDR includes a destination interface parameter used to transmit, to a destination interface, a data packet matching the UL PDR. The SMF sets a value of the destination interface parameter to a value (for example, "5GLAN internal") corresponding to the internal interface of the UPF. It may be understood that the UL FAR in the N4 session corresponding to the PDU session is used to locally forward, to the internal interface of the UPF, the data packet matching the UL PDR in the N4 session.

The DL PDR includes a source interface parameter and an Ethernet filter parameter (a MAC address, an Ethernet type, and an Ethernet tag) or Ethernet PDU session information (a MAC address of UE).

The DL FAR associated with the DL PDR includes a destination interface parameter and/or an external tunnel parameter that are/is used to transmit, to a destination interface, a data packet matching the DL PDR. The SMF network element sets a value of the destination interface parameter to "access side" or "core side", and sets a value of the external tunnel parameter to tunnel information of the PDU session (for example, a tunnel header General Packet Radio Service (GPRS) Tunneling Protocol (GTP)-User Plane (GTP-U) Tunnel Endpoint Identifier (TEID) of the PDU session in an AN or on the UPF network element). It may be understood that the DL FAR in the N4 session corresponding to the PDU session is used to transmit, to a specified PDU session tunnel, the data packet matching the DL PDR in the N4 session.

For the group-level N4 session, the UL PDR includes a source interface parameter and an Ethernet filter parameter or an Ethernet PDU session information parameter (a MAC address of UE).

The UL FAR associated with the UL PDR includes a destination interface parameter and/or an external tunnel parameter that are/is used to forward, to a destination interface, a data packet matching the UL PDR. The SMF sets a value of the destination interface parameter to "5GLAN N19" or "core side", and sets a value of the external tunnel parameter to information about an N19 tunnel (for example, a tunnel header GTP-U TEID of a peer UPF connected to the UPF). It may be understood that the UL FAR in the group-level N4 session is used to forward, to an N19 tunnel that connects the UPF and another UPF, the data packet matching the UL PDR in the group-level N4 session.

The DL PDR includes a source interface parameter and/or a tunnel information parameter.

The DL FAR associated with the DL PDR includes a destination interface parameter used to transmit, to a destination interface, a data packet matching the DL PDR. The SMF sets a value of the destination interface parameter to a value (for example "5GLAN internal") corresponding to the internal interface of the UPF. It may be understood that the DL FAR in the group-level N4 session is used to locally forward, to the internal interface of the UPF, the data packet matching the DL PDR in the group-level N4 session.

(3) A process of matching a data packet with a PDR

After receiving a data packet, a UPF network element detects the data packet, and determines that the data packet matches a PDR (in other words, the data packet successfully matches the PDR, or the PDR successfully matches the data packet). For example, the following four matching processes are included.

(1) The data packet is detected based on PDU session tunnel information of the incoming data packet, interface information of the incoming data packet, and/or header information of the data packet, and/or a source MAC address of the data packet. If the PDU session tunnel information of the incoming data packet, the interface information of the incoming data packet, and/or the header information of the data packet, and/or the source MAC address of the data packet match, one by one, corresponding parameters in the UL PDR of the N4 session corresponding to the PDU session, the UL PDR of the N4 session corresponding to the PDU session successfully matches the incoming data packet.

(2) The data packet is detected based on interface information of the incoming data packet and header information of the data packet or a destination MAC address of the data packet. If the interface information of the incoming data packet and the header information of the data packet or the destination MAC address of the data packet match, one by one, corresponding parameters in the DL PDR of the N4 session corresponding to the PDU session, the DL PDR of the N4 session corresponding to the PDU session successfully matches the incoming data packet.

(3) The data packet is detected based on interface information of the incoming data packet and header information, a destination MAC address, or a source MAC address of the data packet. If the interface information of the incoming data packet and the header information, the destination MAC address or the source MAC address of the data packet match, one by one, corresponding parameters in the UL PDR of the group-level N4 session, the UL PDR of the group-level N4 session successfully matches the incoming data packet.

(4) The data packet is detected based on interface information of the incoming data packet and/or N19 tunnel information of the incoming data packet. If the interface information of the incoming data packet and/or the tunnel information of the incoming data packet match/matches, one by one, corresponding parameters in the DL PDR of the group-level N4 session, the DL PDR of the group-level N4 session successfully matches the incoming data packet.

In an example implementation process, the UPF network element performs one or more of the foregoing four matching processes, to match the data packet with the PDR.

(4) A process of forwarding a data packet based on a PDR and an FAR in an N4 session.

Figure 4A:
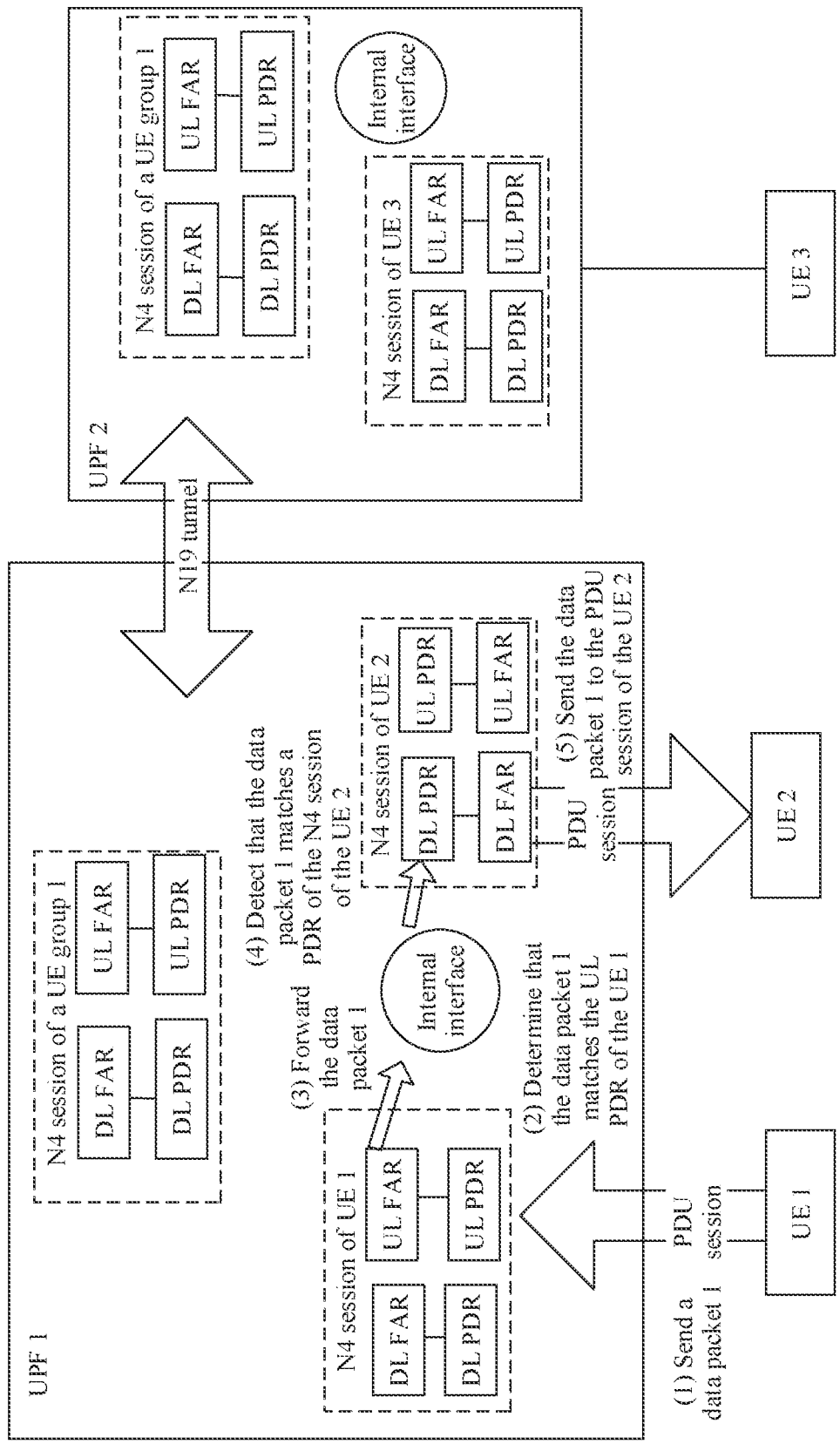
FIG. 4A is a flowchart of an example of an internal forwarding procedure of a UPF network element.
Figure 4B:
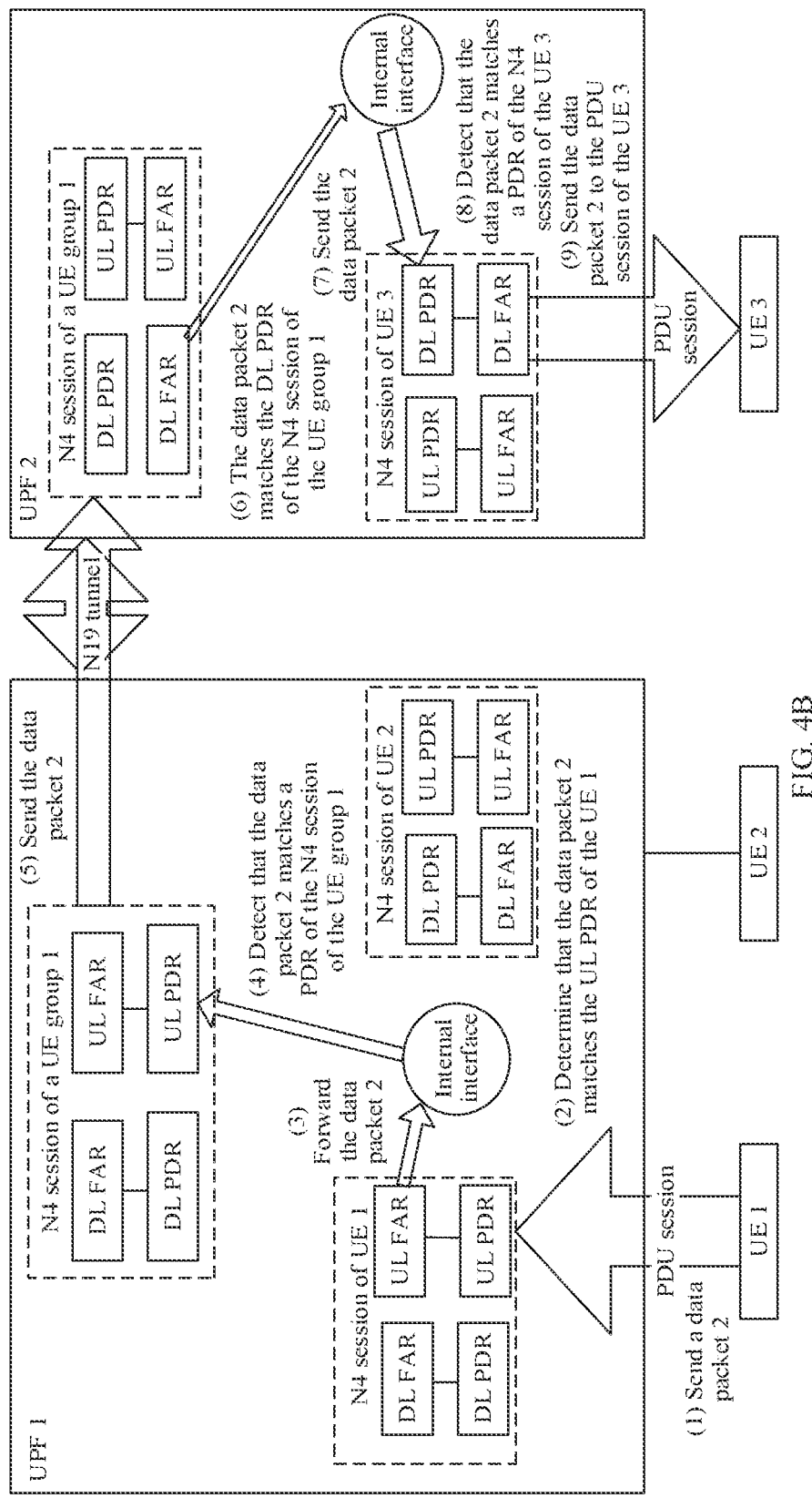
FIG. 4B is a flowchart of another example of an internal forwarding procedure of a UPF network element.

FIG. 4A and FIG. 4B are schematic diagrams of forwarding a data packet based on a PDR and an FAR. FIG. 4A and FIG. 4B include a UPF 1 and a UPF 2. UE 1 and UE 2 are connected to the UPF 1, UE 3 is connected to the UPF 2, and the UE 1 to the UE 3 are a 5G VN group (group 1). The UPF 1 includes an N4 session of the UE 1, an N4 session of the UE 2, and an N4 session of the group 1.

Refer to FIG. 4A. The first forwarding process is an internal forwarding process of a UPF network element.

(1) The UE 1 sends a data packet 1 through a PDU session of the UE 1.

(2) The UPF 1 receives the data packet 1, performs a process of matching the data packet with a PDR, and detects that the data packet 1 matches a UL PDR of the N4 session of the UE 1.

(3) The UPF 1 obtains a UL FAR associated with the UL PDR of the N4 session of the UE 1, determines that a destination interface of the FAR is an internal interface of the UPF 1, and sends the data packet to the internal interface of the UPF 1.

(4) The UPF 1 receives the data packet transmitted through the internal interface, performs a process of matching the data packet with a PDR, and detects that the data packet matches a DL PDR of the N4 session of the UE 2.

(5) The UPF 1 obtains a DL FAR associated with the DL PDR of the N4 session of the UE 2, determines tunnel information of a PDU session of the UE 2, and sends the data packet to the PDU session of the UE 2, such that the UE 2 receives the data packet through the PDU session of the UE 2.

Refer to FIG. 4B. The second forwarding process is a forwarding process across UPF network elements.

(1) The UE 1 sends a data packet 2 through a PDU session of the UE 1.

(2) The UPF 1 receives the data packet 2, performs a process of matching the data packet with a PDR, and detects that the data packet 2 matches a UL PDR of the N4 session of the UE 1.

(3) The UPF 1 obtains a UL FAR associated with the UL PDR of the N4 session of the UE 1, determines that a destination interface of the FAR is an internal interface of the UPF 1, and sends the data packet 2 to the internal interface of the UPF 1.

(4) The UPF 1 receives the data packet 2 transmitted through the internal interface, performs a process of matching the data packet 2 with a PDR, and detects that the data packet 2 matches a UL PDR of the N4 session of the group 1.

(5) The UPF 1 obtains a UL FAR associated with the UL PDR of the N4 session of the group 1, determines an N19 tunnel between the UPF 1 and the UPF 2, and sends the data packet 2 to the UPF 2 through the N19 tunnel.

(6) The UPF 2 receives the data packet 2 sent through the N19 tunnel, performs a process of matching the data packet 2 with a PDR, and detects that the data packet 2 matches a DL PDR of the N4 session of the group 1.

(7) The UPF 2 obtains a DL FAR associated with the DL PDR of the N4 session of the group 1, determines that a destination interface of the FAR is an internal interface of the UPF 2, and sends the data packet 2 to the internal interface of the UPF 2.

(8) The UPF 2 receives the data packet 2 transmitted through the internal interface, performs a process of matching the data packet 2 with a PDR, and detects that the data packet 2 matches a DL PDR of an N4 session of the UE 3.

(9) The UPF 2 obtains a DL FAR associated with the DL PDR of the N4 session of the UE 3, determines tunnel information of a PDU session of the UE 3, and sends the data packet 2 to the PDU session of the UE 3, such that the UE 3 receives the data packet 2 through the PDU session of the UE 3.

(5) An internal interface of a UPF is a virtual port or a specific port in the UPF network element, and is used by the UPF network element to locally forward a received data packet. That a data packet is locally forwarded to the internal interface of the UPF network element means that the UPF network element receives the data packet again through the internal interface, such that the data packet is detected again by the UPF network element, to match a corresponding routing rule by classification, and be forwarded along a correct path. Before re-detection, the UPF network element may decapsulate an external tunnel header for the data packet. Optionally, new external tunnel header information may be re-encapsulated for the data packet. The new tunnel information may be included in an FAR in the routing rule, or may be generated by the UPF network element based on forwarding indication information in the FAR.

(6) A process of determining an unknown MAC address

After receiving a data packet through a PDU session, a UPF network element performs a process of matching the data packet with a PDR, and detects that the data packet matches a UL PDR of an N4 session in the UPF network element. However, there is no DL PDR, of the N4 session, matching the data packet sent to a source MAC address of the data packet (it may be understood that the PDR of the N4 session cannot be used to detect a data packet whose destination MAC address is the source MAC address of the data packet), the UPF network element determines that the source MAC address of the data packet is an unknown MAC address, or it may be considered that unknown MAC is detected in the N4 session.

Alternatively, an SMF network element indicates the UPF network element to use the matched UL PDR to detect an unknown MAC address, and the UL PDR includes a source MAC address. For example, a filter includes the source MAC address, or Ethernet session information includes the source MAC address, the UPF network element determines that the source MAC address of the data packet is an unknown MAC address.

Alternatively, the UPF network element determines that tunnel header information of the data packet includes indication information used to indicate self-learning, a source MAC address of the data packet is an unknown MAC address. Alternatively, the SMF network element indicates the UPF network element to use the matched UL PDR to detect an unknown MAC address, and the UL PDR includes indication information used to indicate the unknown MAC address, for example, a broadcast destination address, a multicast destination address, and a virtual local area network (VLAN) tag, indication information used to indicate self-learning, the UPF network element determines that a source MAC address of the data packet is an unknown MAC address.

(7) MAC address self-learning means that a session management function network element is not involved and a user plane function network element generates a routing rule corresponding to an unknown MAC address. In the embodiments of this application, MAC address self-learning may also be referred to as unknown MAC address self-learning.

(8) In the descriptions of this application, "a plurality of" means two or more. In view of this, in the embodiments of this application, "a plurality of" may also be understood as "at least two". The term "at least one" may be understood as one or more, for example, understood as one, two, or more. For example, including at least one means including one, two, or more, and items included are not limited. For example, including at least one of A, B, and C means that A, B, C, A and B, A and C, B and C, or all of A, B, and C may be included. The term "and/or" describes an association relationship for describing associated objects and indicates that three relationships may exist. For example, A and/or B may indicate the following three cases: Only A exists, both A and B exist, and only B exists. In addition, the character "/" generally indicates an "or" relationship between the associated objects unless otherwise stated. The terms "system" and "network" are used interchangeably in the embodiments of this application.

Unless otherwise stated on the contrary, ordinal numerals such as "first" and "second" in the embodiments of this application are used to distinguish between a plurality of objects, and are not intended to limit a sequence, a time sequence, priorities, or an importance of the plurality of objects.

In addition, the user plane architectures of the 5GLAN service are further applicable to a future-oriented communications technology. The user plane architectures of the 5GLAN service described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

The following describes technical features in the embodiments of this application.

Communication between a UE and a LAN in a DN or private communication between UEs is performed based on a routing rule set on a UPF network element. Before the UE performs communication, an SMF network element creates a PDU session, an N4 session (or a UE-level N4 session) corresponding to the PDU session, and a group-level N4 session corresponding to the PDU session for the UE.

In a case, for a data packet received by the UPF network element through the PDU session, a source MAC address of the data packet is an unknown MAC address. In this case, the UPF network element exchanges signaling with the SMF network element, to set a routing rule corresponding to the unknown MAC address.

Figure 5:
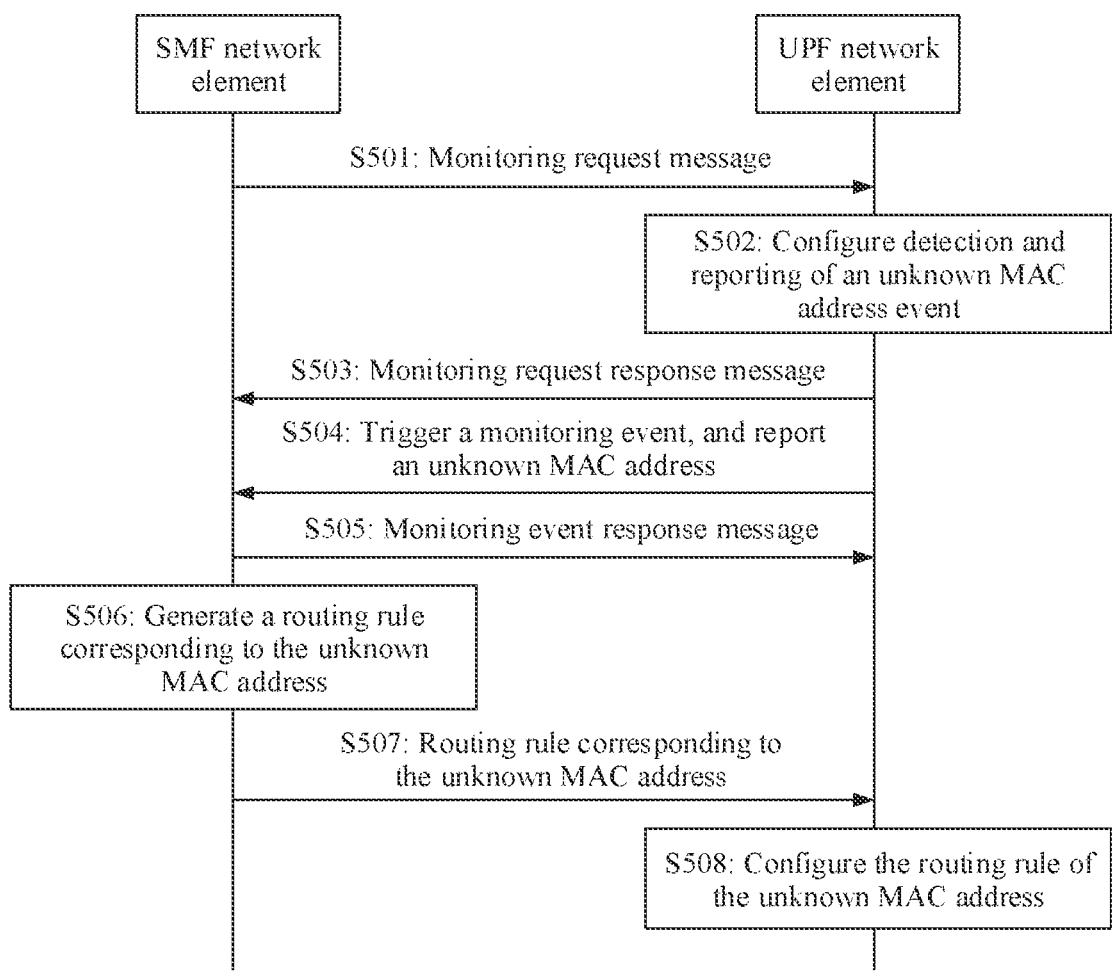
FIG. 5 is a flowchart of setting a routing rule corresponding to an unknown MAC address.

FIG. 5 is a flowchart of setting a routing rule corresponding to an unknown MAC address. The flowchart is described as follows.

S501: An SMF network element sends a monitoring request message to a UPF network element, and the UPF network element receives the monitoring request message.

The monitoring request is used to configure detection and reporting of an unknown MAC address event on the UPF.

S502: The UPF network element configures detection and reporting of the unknown MAC address event based on the monitoring request message.

S503: After successful configuration, the UPF network element sends a monitoring request response message to the SMF network element, and the SMF network element receives the monitoring request response message.

The SMF network element has successfully configured detection and reporting of the unknown MAC address event on the UPF.

S504: After detecting a data packet of an unknown MAC address, the UPF network element triggers a monitoring event, and reports the unknown MAC address to the SMF network element.

S505: After obtaining the unknown MAC address, the SMF network element sends a monitoring event response message to the UPF network element.

S506: The SMF network element generates a routing rule corresponding to the unknown MAC address.

S507: The SMF network element sends the generated routing rule corresponding to the unknown MAC address to the UPF network element, and the UPF network element receives the routing rule corresponding to the unknown MAC address.

S508: The UPF network element sets the routing rule corresponding to the unknown MAC address, and after completing the setting, sends a setting complete response message to the SMF network element.

In the procedure shown in FIG. 5, at least six pieces of exchanged signaling are required between the SMF network element and the UPF network element (two pieces of exchanged signaling are used by the SMF network element to configure detection and reporting of the unknown MAC address event on the UPF network element, two pieces of exchanged signaling are used by the SMF network element to receive an unknown address event report sent by the UPF network element, and two pieces of exchanged signaling are used by the SMF network element to configure the routing rule corresponding to the unknown MAC address on the UPF network element) to set the routing rule corresponding to the unknown MAC address for the UPF network element. It can be learned that signaling overheads are relatively high.

The procedure shown in FIG. 5 is described using one terminal connected to the UPF network element. When a quantity of terminals connected to the UPF network element is relatively large or a quantity of UPF network elements configured to provide a 5GLAN service is relatively large, signaling overheads between the SMF network element and the UPF network element are higher.

In view of this, based on the network architectures shown in FIG. 1 and FIG. 2, the embodiments of this application provide a routing rule management method and a communications apparatus, to reduce signaling overheads between an SMF network element and a UPF network element when a routing rule is configured for an unknown address.

It should be noted that in the embodiments of this application, a user plane function network element is a UPF network element, a session management function network element is an SMF network element, and a policy control function network element is a PCF network element. A first user plane function network element and a second user plane function network element are different UPF network elements. The first UPF network element is one of the plurality of UPF network elements shown in FIG. 3A or FIG. 3B, and the second UPF network element is another of the plurality of UPF network elements shown in FIG. 3A or FIG. 3B, or the second UPF network element is each UPF network element other than the first UPF network element in the plurality of UPF network elements shown in FIG. 3A or FIG. 3B (to be more specific, other UPFs other than the first UPF network element perform the same steps as the second UPF network element).

In addition, the UPF network element, the SMF network element, and the PCF network element may be used as independent physical function entities or logical function entities during actual application.

Figure 6A:
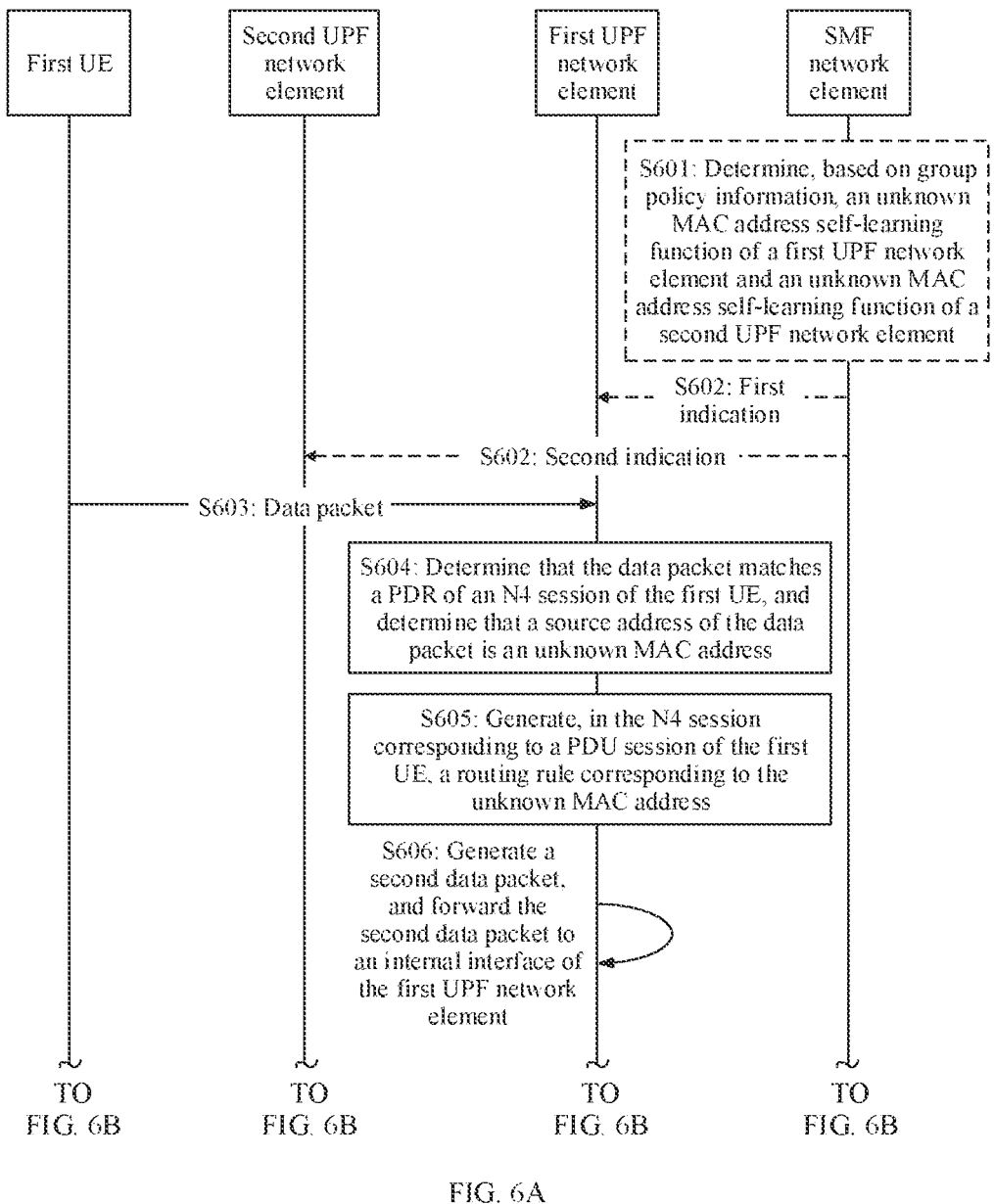
FIG. 6A and FIG. 6B are a flowchart of a routing rule management method according to an embodiment of this application.
Figure 6B:
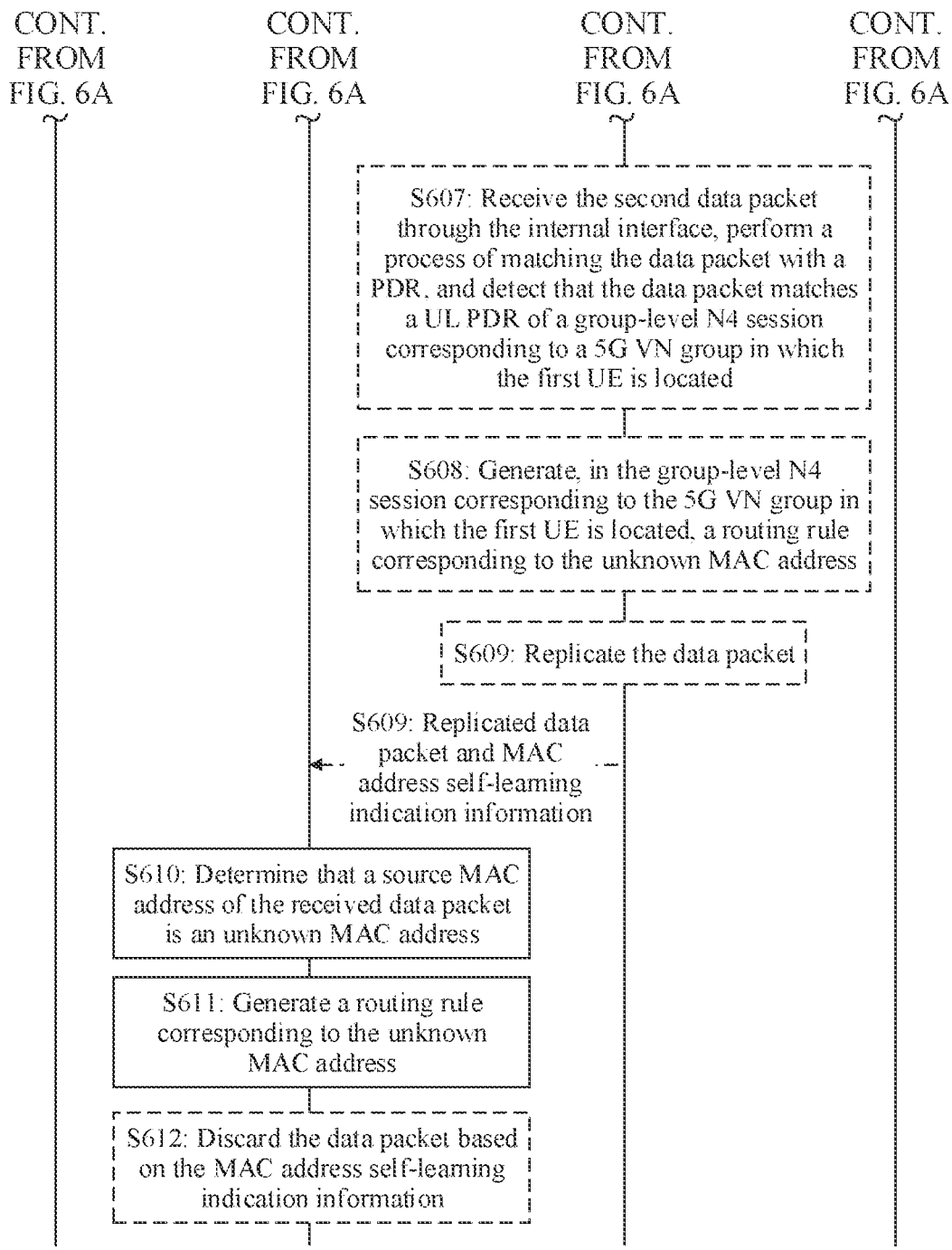

FIG. 6A and FIG. 6B are a flowchart of a routing rule management method according to an embodiment of this application. The flowchart is described as follows:

S601: An SMF network element determines, based on group policy information, that a first UPF network element and a second UPF network element each enable an unknown MAC address self-learning function.

In this embodiment of this application, the first UPF network element and the second UPF network element each have the unknown MAC address self-learning function. The unknown MAC address self-learning function means that the SMF network element is not involved, and the UPF network element generates a routing rule corresponding to an unknown MAC address. The routing rule refers to a PDR and an FAR that correspond to a data packet sent to the unknown MAC address.

The group policy information includes information used to indicate to enable the unknown MAC address self-learning function or information used to indicate not to enable the unknown MAC address self-learning function, and the SMF network element determines, based on the information, whether to enable the unknown MAC address self-learning function of the first UPF network element and the unknown MAC address self-learning function of the second UPF network element.

In an example, when the group policy information includes the information used to indicate to enable the unknown MAC address self-learning function, the SMF network element may further determine, based on whether the group policy information carries an identifier of a 5G VN group, to enable the unknown MAC address self-learning function of the first UPF network element for all VN groups (which may be understood as that after an unknown MAC address is determined in any N4 session of the first UPF network element, the first UPF network element self-learns the unknown MAC address) or enable the unknown MAC address self-learning function of the first UPF network element for a part of 5G VN groups (which may be understood as that the first UPF network element self-learns an unknown MAC address only after the unknown MAC address is determined in specified UE-level and group-level N4 sessions related to a 5G VN group).

For example, if the group policy information does not include the identifier of the 5G VN group, the SMF network element determines to enable an unknown MAC address self-learning function of a UPF network element for all 5G VN groups. If the group policy information includes the identifier of the 5G VN group, the SMF network element determines to enable an unknown MAC address self-learning function of a UPF network element only for the 5G VN group.

In this embodiment of this application, the group policy information may be preconfigured on the SMF network element by an operation, administration and maintenance (OAM) network element, or the group policy information is determined by a PCF network element and sent to the SMF network element. Certainly, if group policy information has been preconfigured on the SMF network element, and the SMF network element also receives group policy information sent by the PCF network element, in other words, the preconfigured group policy information and the group policy information that is sent by the PCF network element coexist, the SMF network element may preferentially consider the group policy information sent by the PCF network element. If the SMF network element cannot determine, based on the group policy information sent by the PCF network element, whether to enable an unknown MAC address self-learning function for a 5G VN group, the SMF network element considers using the preconfigured group policy information to determine whether to enable the unknown MAC address self-learning function.

S602: The SMF network element sends a first indication and a second indication, the first UPF network element receives the first indication, and the second UPF network element receives the second indication.

After the SMF network element determines, based on group policy information of a 5G VN group, to enable an unknown MAC address self-learning function, the SMF network element may determine, based on a prestored correspondence between a 5G local area network (LAN) group and a user plane function network element, at least one user plane function network element included in a first 5G LAN group to which the group policy information belongs, and then send the first indication to each of the at least one user plane function network element included in the first 5G LAN group.

For example, the SMF network element determines that a MAC address self-learning function of each UPF network element (for example, the first UPF network element and the second UPF network element) included in the first 5G LAN group needs to be enabled, and then may send the first indication to each of the first UPF network element and the second UPF network element.

Alternatively, the SMF network element may send the first indication to the first UPF network element, and send the second indication to the second UPF network element, where the first indication is used to indicate the first UPF network element to enable the unknown MAC address self-learning function, and the second indication is used to indicate the second UPF network element to enable the unknown MAC address self-learning function. In this case, it may be understood as that the first indication and the second indication are actually a same indication, and the indication is used to indicate the UPF network element to enable the unknown MAC address self-learning function. However, because the SMF network element sends the indication to a plurality of UPF network elements, the first indication and the second indication are used for distinguishing of the indication based on different objects to which the indication is sent. In FIG. 6A and FIG. 6B, the first indication and the second indication are used as an example for description.

The following describes the first indication. There may be, but is not limited to, the following two cases for the first indication.

Case A: If the SMF network element determines that the unknown MAC address self-learning function is enabled for all the 5G VN groups, the first indication is used to indicate the first UPF network element to self-learn all unknown MAC addresses, or the first indication is used to activate the unknown MAC address self-learning function of the first UPF network element. For example, the UPF 1 shown in FIG. 3B includes two 5G VN groups, which are respectively the group 1 and the group 2. In this way, after the first UPF network element receives the first indication, the first UPF network element self-learns an unknown MAC address provided that the unknown MAC address is determined in any N4 session.

Case B: If the SMF network element determines to enable the unknown MAC address self-learning function for the part of 5G VN groups, the first indication is used to indicate the first UPF network element to self-learn an unknown MAC address for a specified group. For example, the UPF 1 shown in FIG. 3B includes two 5G VN groups, which are respectively the group 1 and the group 2. If the first indication is used to indicate the UPF 1 to enable an unknown MAC address self-learning function for the group 1, after receiving the first indication, the UPF 1 learns unknown MAC addresses determined in only N4 sessions corresponding to the UE 1 to the UE 3 and the UE 6 (that is, UE-level N4 sessions of the UE 1 to the UE 3 and the UE 6 and a group-level N4 session of the group 1), and does not self-learn unknown MAC addresses determined in N4 sessions corresponding to the UE 4 and the UE 5 (that is, UE-level N4 sessions of the UE 4 and the UE 5 and a group-level N4 session of the group 2).

Certainly, if the SMF network element determines that the first UPF network element does not enable the unknown MAC address self-learning function or preconfigures the first UPF network element to enable the unknown MAC address self-learning function, the SMF network element may not generate the first indication. In this embodiment of this application, an example in which the SMF network element determines that the first UPF network element needs to self-learn the unknown MAC address is used.

In this embodiment of this application, manners in which the SMF network element sends the first indication may include but are not limited to the following two manners.

In a first sending manner, the first indication is carried in an N4 session creation request for sending.

The SMF network element sends the first indication to the first UPF network element in an N4 session creation process. In an example, the SMF network element receives a PDU session creation request sent by a terminal, where the PDU session creation request includes a data network name (DNN), and then the SMF network element determines that the DNN is associated with the first 5GLAN group. In this case, the SMF network element sends the first indication to a UPF network element anchored by the PDU session. For example, if the UE 1 is anchored to the first UPF network element, the SMF network element sends an N4 session creation request to the first UPF network element, and includes the first indication in the N4 session creation request. In this embodiment of this application, the N4 session creation request includes an N4 session creation request (that is, a group-level N4 session creation request) corresponding to the 5GLAN group and/or an N4 session creation request (that is, a UE-level N4 session creation request) corresponding to the PDU session. For example, the SMF network element may indicate, using an information element (IE) in a session creation request that is sent to the first UPF network element and used to create an N4 session, the first UPF network element to self-learn the unknown MAC address. The first indication may be used as an independent extension IE in an N4 message, or may be used as an extension value of an existing IE. The first indication may be located in a PDR, an FAR, or a usage report rule (URR), or may be notified to the UPF independently of the routing rule. For example, a bit is added to the session creation request, and a value of the bit is used to indicate whether the first UPF network element self-learns the unknown MAC address. For example, when the value of the bit is 1, the first UPF network element is indicated to self-learn the unknown MAC address; when the value of the bit is 0, the first UPF network element is indicated not to self-learn the unknown MAC address. The first UPF may store the first indication, and enable the unknown MAC address self-learning function based on the first indication when detecting the unknown MAC address. Alternatively, the first UPF may activate the MAC address self-learning function for the N4 session, and directly enable the unknown MAC address self-learning function when the unknown MAC address is detected in the N4 session.

In a second sending manner, the first indication is separately sent.

The first indication is used as an independent signaling message. For example, the first indication may be media access control address self-learning control signaling or other signaling. The first indication may be sent after the SMF network element creates the group-level N4 session, or may be sent before the first group-level N4 session is created. A moment of sending the first indication is not limited in this embodiment of this application. After the unknown MAC address is detected in the group-related UE-level N4 session and the group-level N4 session, the unknown MAC address self-learning function is enabled.

In an example, the first indication may carry a group identifier, for example, a data network name (DNN) or network instance information, of a 5G VN group for which the first UPF network element self-learns an unknown MAC address. If the first UPF network element is indicated to self-learn unknown MAC addresses of a plurality of 5G VN groups, the first indication may carry a plurality of group identifiers. Alternatively, the first indication may not carry an identifier of any 5G VN group. In other words, the first indication is used to indicate the first UPF network element to self-learn unknown MAC addresses of all 5G VN groups of the first UPF network element.

In this case, if the SMF network element does not send the first indication, the first UPF network element determines, based on a local configuration, whether to enable the unknown MAC address self-learning function. If the SMF network element determines that the second UPF network element enables the unknown MAC address self-learning function, the SMF network element also sends the first indication to the second UPF network element, to enable the unknown MAC address self-learning function of the second UPF network element. In FIG. 6A and FIG. 6B, an example in which the SMF network element separately sends the first indication to the first UPF network element and the second UPF network element is used.

It should be noted that step S601 and step S602 are optional steps, and are not mandatory to be performed. For example, the unknown MAC address self-learning function of the UPF network element is preconfigured, that is, provided that the UPF network element detects that an unknown MAC address is included, the UPF network element independently determines whether to generate a routing rule corresponding to the unknown MAC address. In this case, step S601 and step S602 do not need to be performed. Therefore, in FIG. 6A and FIG. 6B, step S601 and step S602 are represented using dashed lines.

S603: First UE sends a first data packet through a PDU session of the first UE, and the first UPF network element receives the first data packet sent through the PDU session.

In an example, a source address of the first data packet may be a MAC address of the first UE or a MAC address of an end device connected to the first UE, and a destination address is a MAC address of second UE. The first UE and the second UE are located in a same 5G VN group.

S604: The first UPF network element determines that the first data packet matches a PDR of an N4 session of the first UE, and determines that the source address of the first data packet is an unknown MAC address.

After receiving the first data packet, the first UPF network element performs a process of matching the first data packet with a PDR, and detects that the first data packet matches a UL PDR of the N4 session corresponding to a PDU session of the first UE. Then, the first UPF network element performs a process of determining the unknown MAC address, and determines that the source MAC address of the first data packet is the unknown MAC address, that is, that the unknown MAC address is detected in the N4 session corresponding to the PDU session of the first UE.

S605: The first UPF network element generates a first routing rule corresponding to the unknown MAC address.

In this embodiment of this application, the first routing rule that is generated by the first UPF network element and that corresponds to the unknown MAC address may also be understood as a routing rule used to forward, to the PDU session of the first UE, the first data packet sent to the unknown MAC address (or the first data packet whose destination MAC address is the unknown MAC address), such that the first UPF network element detects the matched first data packet sent to the unknown MAC address.

It should be noted that the first routing rule that is generated by the first UPF network element and that corresponds to the unknown MAC address may be understood as a first routing rule corresponding to the PDU session, or may be understood as that the first routing rule belongs to an N4 session in which the PDR matching the first data packet is located (alternatively, it may be understood as that the first routing rule that is generated by the first UPF network element and that corresponds to the unknown MAC address is associated with the N4 session in which the PDR matching the first data packet is located; alternatively, it may be understood as that the first routing rule that is generated by the first UPF network element and that corresponds to the unknown MAC address is stored in an N4 session in which the PDR matching the first data packet is located; alternatively, it may be understood as that the first UPF network element generates, in an N4 session in which the PDR matching the first data packet is located, the first routing rule corresponding to the unknown MAC address). For example, the first UPF network element determines that the first data packet matches the UL PDR of the N4 session corresponding to the PDU session of the first UE, and then the first UPF network element generates, in the N4 session corresponding to the PDU session of the first UE, the first routing rule corresponding to the unknown MAC address.

That the first UPF network element generates the first routing rule corresponding to the unknown MAC address is provided that the routing rule is a DL PDR (that is, a first DL PDR) and a DL FAR (that is, a first DL FAR) is described below.

A value of a destination MAC address parameter or a UE address parameter in the generated DL PDR is the source MAC address, and a value of a source interface parameter in the DL PDR is set to a value (for example, "5GLAN internal") corresponding to an internal interface. A value of a destination interface parameter in the generated DL FAR is set to "access side", and a value of an external tunnel parameter in the generated DL FAR is set to tunnel information of the PDU session of the first UE on an access network or tunnel information of the PDU session of the first UE on an intermediate user plane function network element. The intermediate user plane function network element connects an access network device and the first user plane function network element, and transmits a quality of service flow identifier (QFI) to which the first data packet belongs. Alternatively, a value of a destination interface parameter in the generated DL FAR is set to "core side", and a value of an external tunnel parameter in the generated DL FAR is set to tunnel information of the PDU session of the first UE on an intermediate UPF network element. A QFI to which data belongs is transmitted.

Manners of setting the external tunnel parameter in the DL FAR may include but are not limited to the following two manners.

In a first manner, in a network architecture in which the first UPF network element is directly connected to a serving base station of UE, that is, the first data packet is directly sent to the first UPF through an access network device of the UE 1; in this case, the external tunnel parameter in the DL FAR may be set to the tunnel information of the PDU session on the access network.

In a second manner, in a network architecture in which the first UPF network element is not directly connected to a serving base station of UE, that is, the serving base station of the UE is connected to the first UPF network element through the intermediate UPF network element, and the first data packet is first sent to the intermediate UPF network element through an access network device of the UE 1 and then forwarded to the first UPF through the intermediate UPF network element; in this case, the external tunnel parameter in the DL FAR may be set to the tunnel information of the PDU session on the intermediate UPF network element.

Optionally, the first UPF network element obtains a destination MAC address, an Ethernet type, and the like in the received first data packet. A source MAC address parameter of the DL PDR is set to the destination MAC address of the received first data packet, and an Ethernet type parameter is set to the Ethernet type of the received first data packet. Optionally, when the first UPF obtains an Ethernet tag in the received first data packet, for example, a virtual local area network tag, an S tag, a priority code point, or a drop eligible indicator, an Ethernet tag parameter of the DL PDR is set to a corresponding Ethernet tag value of the received first data packet.

Network instance parameters of the generated DL PDR and the generated DL FAR are set to network instances of a matched UL PDR.

If the DL FAR already exists in the N4 session corresponding to the PDU session of the first UE, the DL FAR associated with the DL PDR is generated, that is, the first UPF associates the generated DL PDR with the DL FAR used to forward data to a PDU session tunnel, and an FAR ID parameter of the DL PDR is set to a rule identifier (Rule ID) of an existing DL FAR.

S606: The first UPF network element generates a second data packet, and sends the second data packet and MAC address self-learning indication information to an internal interface of the first UPF network element.

In an example, a source address of the second data packet is the unknown MAC address, and a destination address of the second data packet is a broadcast address or a multicast address. It may be understood as that the first UPF network element is triggered to generate the second data packet corresponding to the first data packet and the MAC address self-learning indication information when the first UPF network element detects the unknown MAC address in the N4 session corresponding to the PDU session of the first UE, where the MAC address self-learning indication information may be located in tunnel header information of the second data packet; and then sends the second data packet and the MAC address self-learning indication information to the internal interface.

In another example, the second data packet may include a virtual local area network (VLAN) tag, and the VLAN tag is used to indicate that the second data packet is used for MAC address self-learning. Then, the second data packet including the VLAN tag is sent to the internal interface.

It should be noted that the second data packet is merely used for unknown MAC address self-learning, and a payload of the second data packet may be null, or a payload of the second data packet may be the same as a payload of the first data packet. This is not limited herein.

S607: The first UPF network element receives the second data packet through the internal interface, performs a process of matching the data packet with a PDR, and detects that the second data packet matches a UL PDR of a group-level N4 session corresponding to the 5G VN group in which the first UE is located.

S608: The first UPF network element generates a third routing rule corresponding to the unknown MAC address.

After detecting that the data packet matches the UL PDR of the group-level N4 session (that is, a third N4 session) corresponding to the 5G VN group in which the first UE is located, the first UPF network element performs a process of determining the unknown MAC address, determines that the source MAC address of the data packet is the unknown MAC address, that is, that the unknown MAC address is detected in the group-level N4 session corresponding to the 5G VN group in which the first UE is located, and therefore generates a DL PDR corresponding to the unknown MAC address and a DL FAR associated with the DL PDR.

It should be noted that the third routing rule corresponding to the unknown MAC address generated in this step includes the DL PDR and the DL FAR associated with the DL PDR. The third routing rule belongs to the group-level N4 session corresponding to the 5G VN group in which the first UE is located on the first UPF network element.

The following describes the generated DL PDR and the DL FAR associated with the DL PDR.

A value of a destination MAC address parameter or a UE address parameter in the generated DL PDR is the source MAC address, and a value of a destination interface parameter in the generated DL FAR is set to "5GLAN internal". If the DL FAR already exists in the group-level N4 session corresponding to the 5G VN group in which the first UE is located, the DL FAR associated with the DL PDR is generated, that is, the first UPF network element associates the generated DL PDR with the DL FAR used to locally forward data to the internal interface, and an FAR ID parameter of the DL PDR is set to a rule ID of an existing DL FAR.

Optionally, the first UPF network element may obtain a destination MAC address, an Ethernet type, and the like in the received data packet. A source MAC address parameter of the DL PDR is set to the destination MAC address of the received data packet, and an Ethernet type parameter is set to the Ethernet type of the received data packet. Optionally, when the first UPF network element obtains an Ethernet tag in the received data packet, for example, a virtual local area network tag, an S tag, a priority code point, or a drop eligible indicator, an Ethernet tag parameter of the DL PDR is set to a corresponding Ethernet tag value of the received data packet.

Network instance parameters of the generated DL PDR and the generated DL FAR are set to network instances of a matched UL PDR.

S609: The first UPF network element replicates the second data packet, and forwards a replicated data packet, and the second UPF network element receives the replicated data packet.

The first UPF network element determines that the source MAC address of the second data packet is the unknown MAC address, and determines that tunnel header information of the replicated data packet includes indication information used to indicate unknown MAC address self-learning or that the SMF network element indicates the UPF network element to use the UL PDR matching the second data packet to detect the unknown MAC address. The UL PDR includes indication information used to indicate an unknown MAC address, such as a broadcast destination address, a multicast destination address, a virtual local area network VLAN tag, indication information used to indicate MAC address self-learning. In this case, the first UPF network element is triggered to perform a data packet replication procedure.

In an example, when setting a corresponding routing rule for the group-level N4 session, the SMF network element may set, in the UL FAR associated with the UL PDR, a replication label used to replicate a data packet. In this way, after detecting that the data packet matches the UL PDR of the group-level N4 session, if performing the data packet replication procedure is triggered, the first UPF network element may replicate the received data packet based on the replication label in the UL FAR associated with the UL PDR. For example, the first UPF network element replicates the data packet based on the replication label in the UL FAR associated with the group-level N4 session corresponding to the 5G VN group in which the first UE is located. Then, the first UPF network element may determine information about a tunnel between the first UPF network element and each of at least one other UPF network element based on the UL FAR, for example, tunnel information of an N19 tunnel, and therefore send the data packet through the tunnel corresponding to the determined information about the tunnel (for example, the N19 tunnel) to the at least one other UPF network element.

In addition, when setting the corresponding routing rule for the group-level N4 session, the SMF network element may set, in the UL FAR associated with the UL PDR, a forwarding indication used to forward a replicated data packet. The forwarding indication includes the information about the tunnel between the first UPF network element and each of the at least one other UPF network element. Therefore, after replicating the data packet, the first UPF may also send the replicated data packet to the at least one other UPF network element based on the forwarding indication in the UL FAR.

In another example, after the first UPF network element is triggered to perform the data packet replication procedure, the first UPF network element automatically replicates the second data packet according to a default rule, then determines a second PDR matching the second data packet, and forwards the replicated second data packet based on an external tunnel parameter included in a second FAR associated with the second PDR. The external tunnel parameter in the second FAR is the information about the tunnel between the first UPF network element and each of the at least one other UPF network element, such that the replicated data packet is sent to the at least one other UPF network element based on the determined information about the tunnel. For ease of description, in the following, an example in which the at least one other UPF network element is the second UPF network element is used.

It should be noted that, if the first UPF network element determines that the destination address of the data packet is not a MAC address of UE (or an end device of the UE) connected to the second UPF network element, the replicated data packet is used only for unknown MAC address self-learning. Therefore, the first UPF network element sends MAC address self-learning indication information to the second UPF network element, to indicate the second UPF network element to self-learn the unknown MAC address using the data, then discard the replicated data packet and no longer continue to perform forwarding.

The MAC address self-learning indication information may be sent together with the replicated data packet. In an example, the MAC address self-learning indication information may be located in the tunnel header information of the replicated data packet. The MAC address self-learning indication information may be an independent IE or an extension value of an existing IE in the tunnel header information. For example, an unknown MAC addresses self-learning indication may be added to the tunnel header information of the replicated data. Alternatively, another indication may be added to tunnel information of the replicated data packet, for example, information used to indicate whether the replicated data packet is forwarded, or information used to indicate a forwarding hop count (for example, a remaining hop count and a forwarded hop count). In an example, if the tunnel information of the replicated data packet indicates that the remaining hop count is not greater than 0, it indicates that the replicated data is used only for unknown MAC address self-learning, and no longer continue to be forwarded.

Alternatively, the MAC address self-learning indication information may be implicitly indicated using specific information of the replicated data packet. In an example, the MAC address self-learning indication information may be indicated using a type of the replicated data packet. For example, when a type of the replicated data packet is a type of a broadcast packet or a multicast packet, (for example, the destination address of the replicated data packet is a broadcast address, a multicast address, and the like), it indicates that the replicated data packet is used only for unknown MAC address self-learning. In another example, the MAC address self-learning indication information may be implicitly indicated by including a special virtual local area network (VLAN) tag in the replicated data packet.

In this embodiment of this application, specific content and an indication manner of the MAC address self-learning indication information are not limited.

In addition, the data packet replication procedure performed by the first UPF network element in step S607 and step S609 is described. The data packet replication procedure is not mandatory to be performed. For example, when the first UE and the second UE are located on different UPF network elements, after generating the routing rule corresponding to the unknown MAC address, the first UPF network element forwards the data packet based on the FAR associated with the matched PDR. In the embodiment shown in FIG. 6A and FIG. 6B, an example in which the first UPF network element performs the data packet replication procedure is used.

S610: The second UPF network element determines that a source MAC address of the replicated data packet is an unknown MAC address.

Step S610 is similar to step S604, and is not described repeatedly herein. The second UPF network element detects that the replicated data packet matches a DL PDR of the group-level N4 session (that is, the third N4 session) corresponding to the 5G VN group in which the second UE is located.

S611: The second UPF network element generates a second routing rule corresponding to the unknown MAC address.

The second routing rule may be a second UL PDR and a second UL FAR associated with the second UL PDR. The second routing rule may be understood as belonging to the group-level N4 session corresponding to the 5G VN group in which the second UE is located on the second UPF network element. Alternatively, the second routing rule may be understood as an N4 session corresponding to a tunnel between the first UPF network element and the second UPF network element. Alternatively, the second routing rule may be understood as an N4 session corresponding to a tunnel allocated by the SMF network element for communication between UPF network elements in the 5GLAN group.

The second UPF network element generates, in the group-level N4 session corresponding to the 5G VN group in which the second UE is located, the second UL PDR corresponding to the unknown MAC address and the second UL FAR associated with the UL PDR. A value of a destination MAC address parameter or a UE address parameter in the generated second UL PDR is the source MAC address. A value of a destination interface parameter in the generated second UL FAR is set to "5GLAN N19" or "core side". A value of an external tunnel parameter in the generated second UL FAR is set to tunnel information of an N19 tunnel of an incoming data packet on the first UPF network element, for example, a tunnel header GTP-U TEID on the first UPF network element. If the second UL FAR already exists in the group-level N4 session corresponding to the 5G VN group in which the second UE is located, the second UL FAR associated with the second UL PDR is generated. To be more specific, the second UPF network element associates the generated second UL PDR with the second UL FAR used to forward data to the N19 tunnel, and an FAR ID parameter of the second UL PDR is set to a rule ID of an existing UL FAR.

Optionally, the second UPF network element may further obtain a destination MAC address, an Ethernet type, and/or an Ethernet tag in the received data packet, and set values of a source MAC address parameter, an Ethernet type parameter, and/or an Ethernet tag parameter of the second UL PDR For details, refer to step S605. Details are not described herein again.

Network instance parameters of the generated second UL PDR and the generated second UL FAR are set to network instances of a matched UL PDR.

S612: The second UPF network element discards the data packet based on the MAC address self-learning indication information, and no longer continue to perform forwarding.

It should be noted that step S612 is an optional step, in other words, step S612 is not mandatory, and is shown in dashed lines in FIG. 6A and FIG. 6B.

In the foregoing technical solution, after detecting the unknown MAC address, the first UPF network element may generate a routing rule corresponding to the unknown MAC address without involvement of the SMF network element. Therefore, exchanged signaling between an SMF network element and a UPF network element can be reduced when a routing rule is configured for an unknown MAC address in a conventional technology, and signaling overheads can be reduced.

Figure 7A:
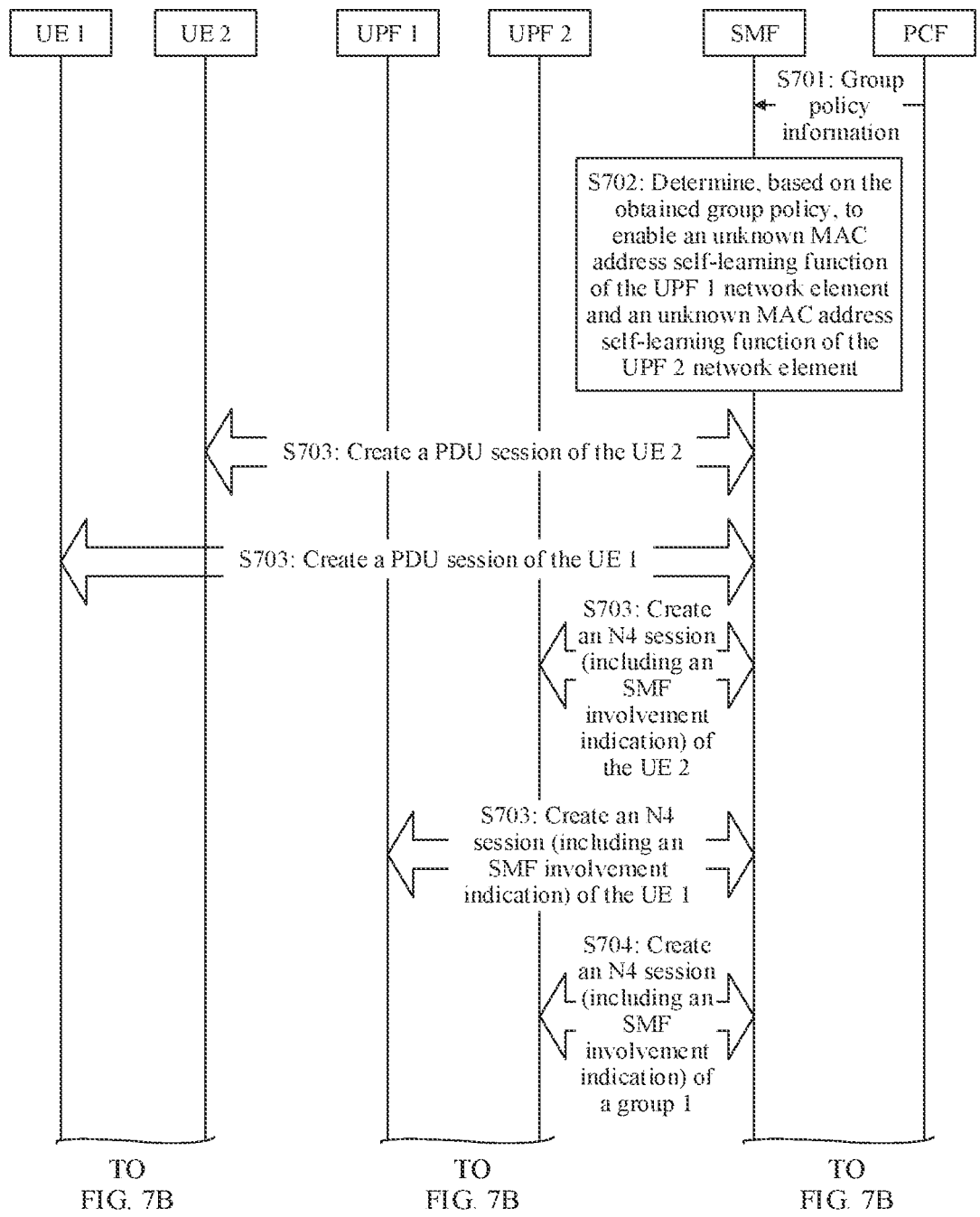
FIG. 7A, FIG. 7B, and FIG. 7C are a flowchart of an example of a routing rule management method according to an embodiment of this application.
Figure 7B:
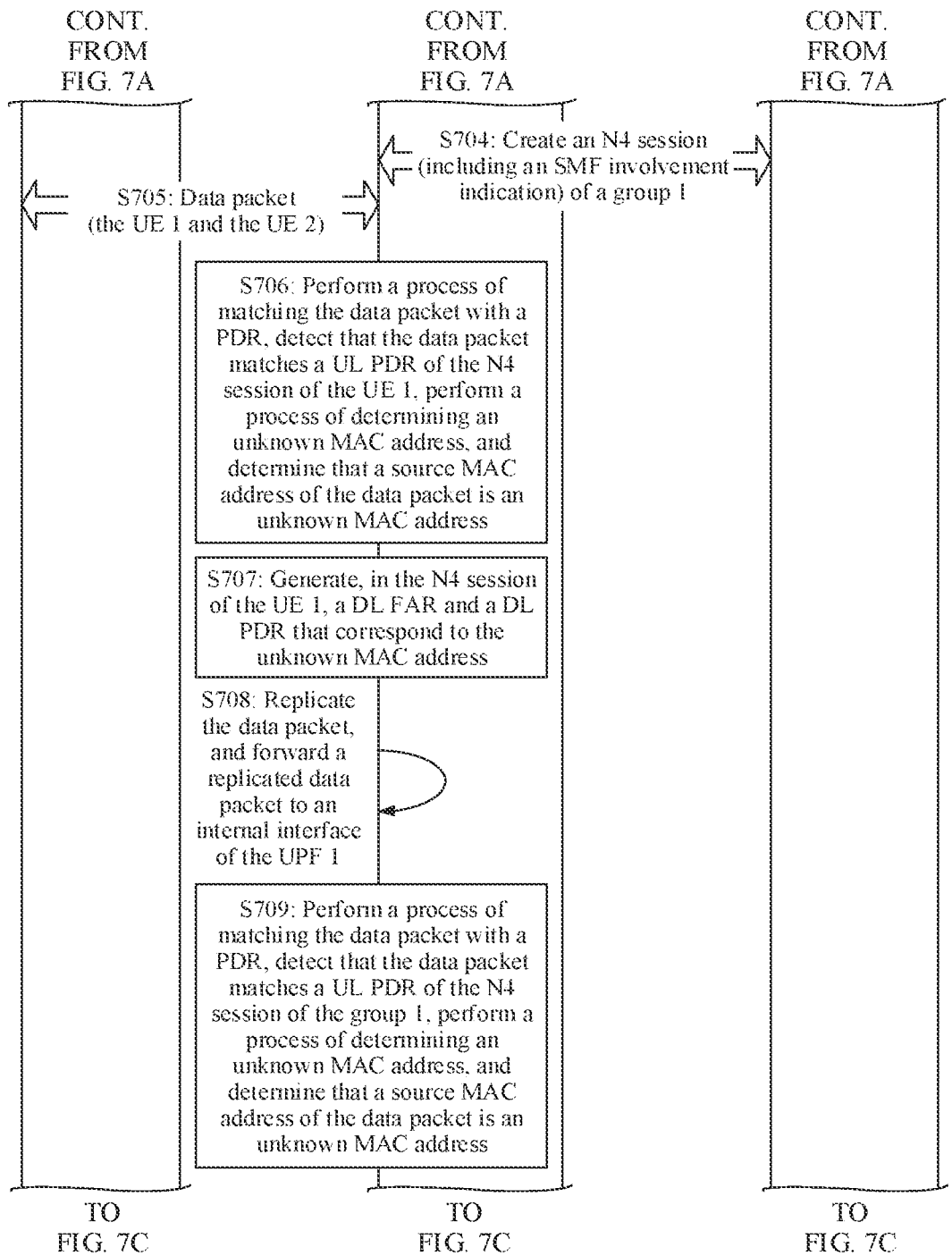
Figure 7C:
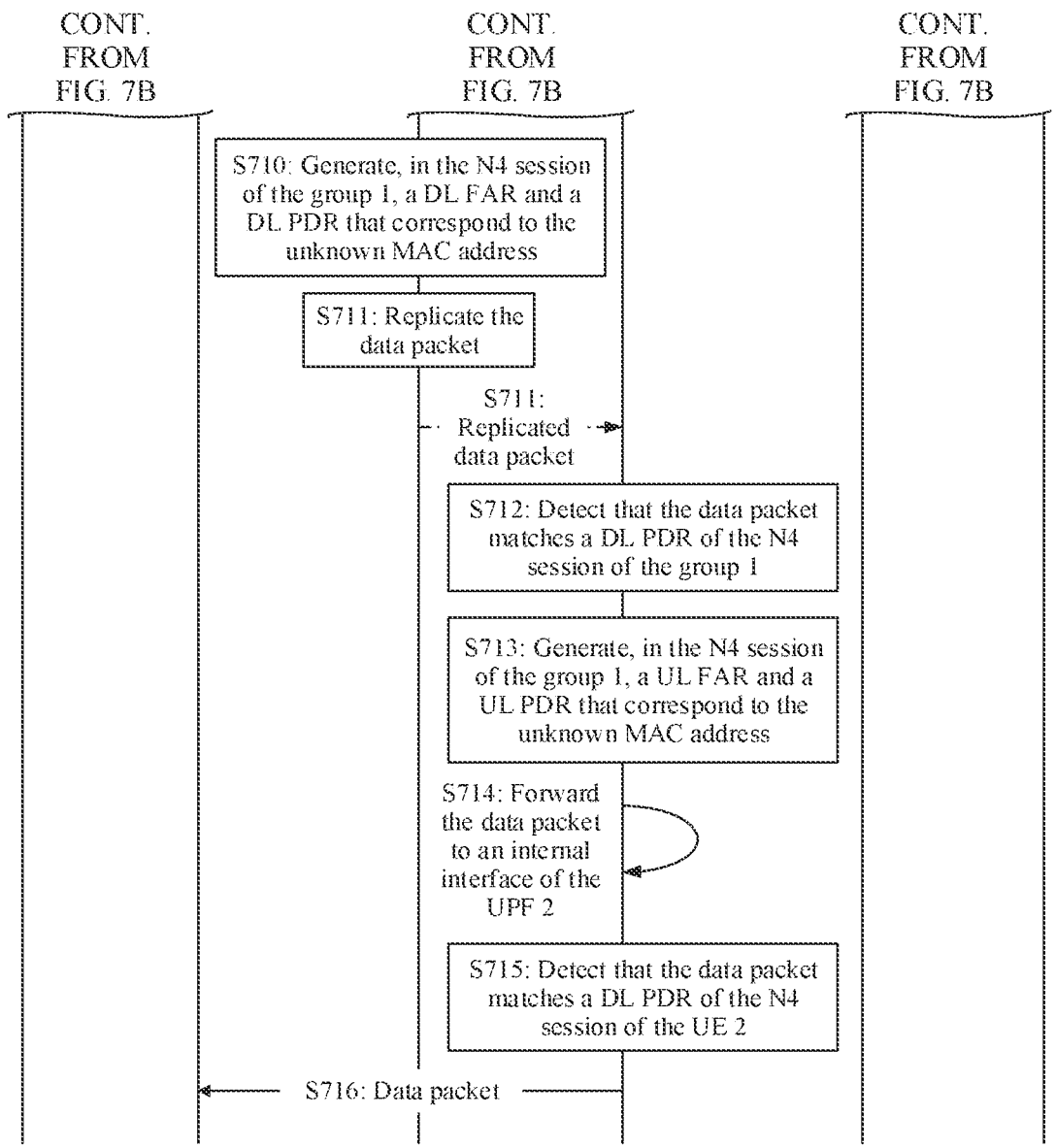

Based on a same concept, an embodiment of this application further provides a local area network communication management method. The method may be considered as an example of the method shown in FIG. 6A and FIG. 6B. FIG. 7A, FIG. 7B, and FIG. 7C are a method flowchart of this example. The method flowchart is described as follows:

S701: A PCF network element sends group policy information, and an SMF network element receives the group policy information.

The group policy information is used to indicate unknown MAC address self-learning (that is, MAC learning without SMF involvement).

S702: The SMF network element determines, based on the group policy information obtained from the PCF network element, to enable MAC learning without SMF involvement of a UPF 1 network element and a UPF 2 network element, that is, to enable an unknown MAC address self-learning function.

S703: The SMF network element creates a PDU session of UE 1 and a PDU session of UE 2, creates, in the UPF 1, an N4 session (which is referred to as an N4 session of the UE 1 for short) corresponding to the PDU session of the UE 1, creates, in the UPF 2 network element, an N4 session (which is referred to as an N4 session of the UE 2 for short) corresponding to the PDU session of the UE 2, and sets an SMF involvement indication (SMF involvement indication) in the created N4 session.

The SMF involvement indication is used to indicate that the SMF network element is not involved in a process of learning an unknown MAC address, that is, indicate to enable an unknown MAC address self-learning function of the UPF 1 network element and an unknown MAC address self-learning function of the UPF 2 network element. The UPF 1 network element and the UPF 2 network element each enable the unknown MAC address self-learning function based on the SMF involvement indication sent by the SMF network element.

In this example, the UE 1 is connected to the UPF 1, the UE 2 is connected to the UPF 2, and the UE 1 and the UE 2 is located in a same 5G VN group marked as a group 1.

S704: The SMF network element creates a group-level N4 session (which is referred to as an N4 session of the group 1 for short) of the group 1 in each of the UPF 1 network element and the UPF 2 network element, and sets the SMF involvement indication (SMF involvement indication) in the N4 session of the group 1.

S705: The UE 1 receives a data packet through the PDU session of the UE 1, and the UPF 1 receives the data packet.

A source MAC address of the data packet is a MAC address of the UE 1, and a destination MAC address of the data packet is a MAC address of the UE 2.

S706: The UPF 1 performs a process of matching the data packet with a PDR, detects that the data packet matches a UL PDR of the N4 session of the UE 1, performs a process of determining an unknown MAC address, and determines that the source MAC address of the data packet is an unknown MAC address.

S707: The UPF 1 network element generates, in the N4 session of the UE 1, a DL PDR and a DL FAR that correspond to the unknown MAC address.

S708: The UPF 1 replicates the data packet, and forwards a replicated data packet to an internal interface of the UPF 1.

S709: The UPF 1 receives the replicated data packet through the internal interface, performs a process of matching the data packet with a PDR, detects that the data packet matches a UL PDR of the N4 session of the group 1, performs a process of determining an unknown MAC address, and determines that the source MAC address of the data packet is an unknown MAC address.

S710: The UPF 1 generates, in the N4 session of the group 1, a DL PDR and a DL FAR that correspond to the unknown MAC address.

S711: The UPF 1 replicates the data packet, and then forwards a replicated data packet to the UPF 2 network element through an N19 tunnel.

It should be noted that if the UPF 1 determines that the UE 2 corresponding to the destination MAC address of the data packet is connected to the UPF 2 network element, no first indication is set in the replicated data packet.

S712: The UPF 2 network element receives the data packet, performs a process of matching the data packet with a PDR, and detects that the data packet matches a DL PDR of the N4 session of the group 1.

S713: The UPF 2 performs a process of determining an unknown MAC address, determines that the source MAC address of the data packet is an unknown MAC address, and generates, in the N4 session of the group 1, a UL PDR corresponding to the unknown MAC address and a UL FAR associated with the UL PDR.

S714: The UPF 2 forwards the received data packet to an internal interface.

S715: The UPF 2 receives the data packet through the internal interface, performs a process of matching the data packet with a PDR, and detects that the data packet matches a DL PDR of the N4 session of the UE 2.

S716: The UPF 2 determines tunnel information of the PDU session of the UE 2 based on a DL FAR associated with the DL PDR of the N4 session of the UE 2, and sends the data packet to a tunnel of the PDU session of the UE 2, and the UE 2 receives the data packet through the PDU session of the UE 2.

In the foregoing embodiments provided in this application, the methods provided in the embodiments of this application are separately described from a perspective of interaction among the first user plane function network element, the second user plane function network element, the session management function network element, and the policy control function network element. To implement functions in the methods provided in the embodiments of this application, the first user plane function network element, the second user plane function network element, the session management function network element, and the policy control function network element may include a hardware structure and/or a software module, and implement the foregoing functions in a form of the hardware structure, the software module, or a combination of hardware structure and the software module. Whether a function in the foregoing functions is performed using the hardware structure, the software module, or the combination of the hardware structure and the software module depends on particular applications and design constraint conditions of the technical solutions.

Figure 8:
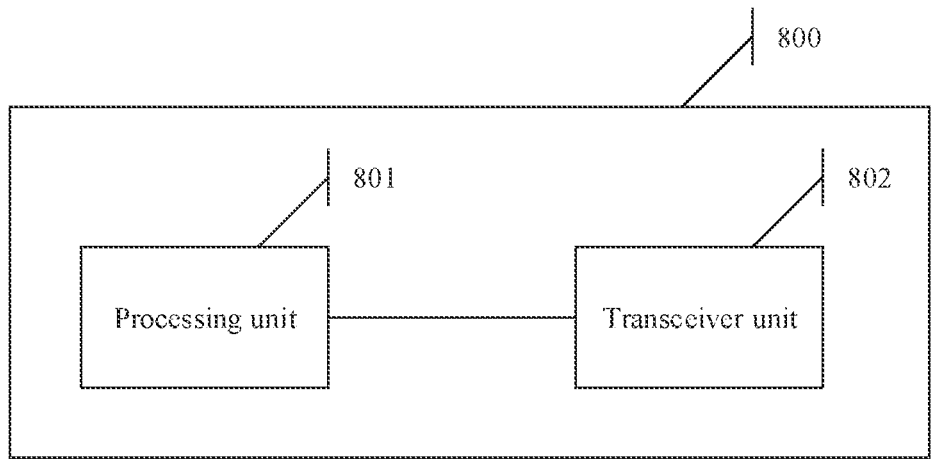
FIG. 8 is a schematic structural diagram of a communications apparatus according to an embodiment of this application.

FIG. 8 is a schematic structural diagram of a communications apparatus 800. The communications apparatus 800 may be a first user plane function network element, and can implement a function of the first user plane function network element in the methods provided in the embodiments of this application. Alternatively, the communications apparatus 800 may be an apparatus that can support a first user plane function network element in implementing a function of the first user plane function network element in the methods provided in the embodiments of this application. The communications apparatus 800 may be a hardware structure, a software module, or a combination of a hardware structure and a software module. The communications apparatus 800 may be implemented by a chip system. In this embodiment of this application, the chip system may include a chip, or may include a chip and another discrete component.

The communications apparatus 800 may include a processing unit 801 and a transceiver unit 802.

The processing unit 801 may be configured to perform step S604 to step S609 in the embodiment shown in FIG. 6A and FIG. 6B, or configured to perform step S706 to step S711 in the embodiment shown in FIG. 7A, FIG. 7B, and FIG. 7C, and/or configured to support another process of the technology described in this specification.

The transceiver unit 802 is configured to implement communication between the communications apparatus 800 and another module, and may be a circuit, a component, an interface, a bus, a software module, a transceiver, or any other apparatus that can implement communication.

The transceiver unit 802 may be configured to perform step S602, step S603, and step S609 in the embodiment shown in FIG. 6A and FIG. 6B, or configured to perform step S703 to step S705 and step S711 in the embodiment shown in FIG. 7A, FIG. 7B, and FIG. 7C, and/or configured to support another process of the technology described in this specification.

All related content of the steps in the foregoing method embodiments may be cited in function descriptions of the corresponding functional modules. Details are not described herein again.

Figure 9:
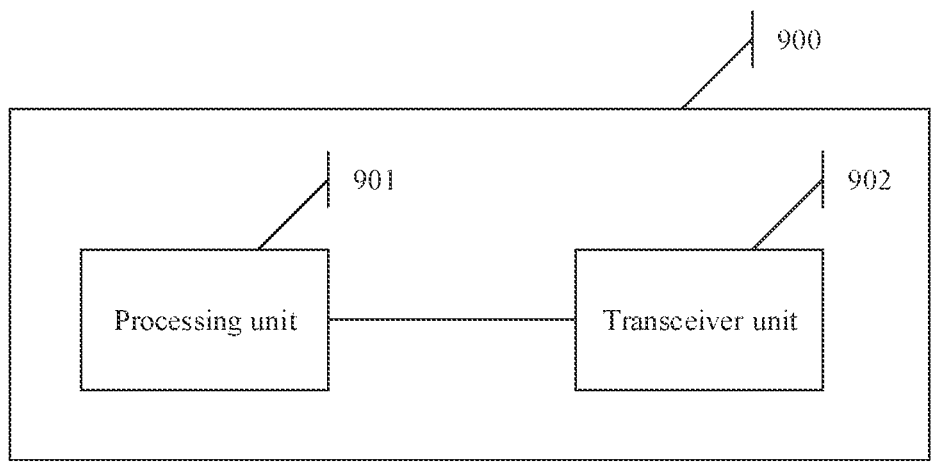
FIG. 9 is a schematic structural diagram of another communications apparatus according to an embodiment of this application.

FIG. 9 is a schematic structural diagram of a communications apparatus 900. The communications apparatus 900 may be a second user plane function network element, and can implement a function of the second user plane function network element in the methods provided in the embodiments of this application. Alternatively, the communications apparatus 900 may be an apparatus that can support a second user plane function network element in implementing a function of the second user plane function network element in the methods provided in the embodiments of this application. The communications apparatus 900 may be a hardware structure, a software module, or a combination of a hardware structure and a software module. The communications apparatus 900 may be implemented by a chip system. In this embodiment of this application, the chip system may include a chip, or may include a chip and another discrete component.

The communications apparatus 900 may include a processing unit 901 and a transceiver unit 902.

The processing unit 901 may be configured to perform step S610 to step S612 in the embodiment shown in FIG. 6A and FIG. 6B, or configured to perform step S712 to step S715 in the embodiment shown in FIG. 7A, FIG. 7B, and FIG. 7C, and/or configured to support another process of the technology described in this specification.

The transceiver unit 902 is configured to implement communication between the communications apparatus 900 and another module, and may be a circuit, a component, an interface, a bus, a software module, a transceiver, or any other apparatus that can implement communication.

The transceiver unit 902 may be configured to perform step S602 and step S609 in the embodiment shown in FIG. 6A and FIG. 6B, or configured to perform step S703, step S704, step S711, and step S716 in the embodiment shown in FIG. 7A, FIG. 7B, and FIG. 7C, and/or configured to support another process of the technology described in this specification.

All related content of the steps in the foregoing method embodiments may be cited in function descriptions of the corresponding functional modules. Details are not described herein again.

Figure 10:
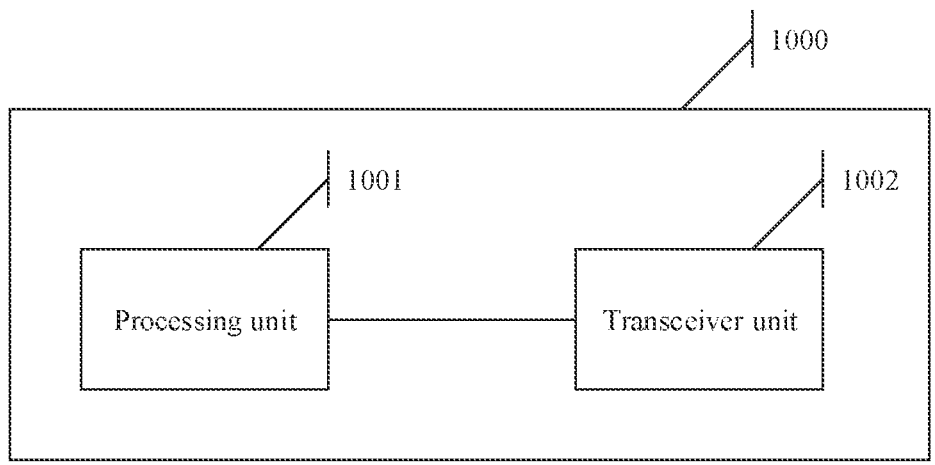
FIG. 10 is a schematic structural diagram of another communications apparatus according to an embodiment of this application.

FIG. 10 is a schematic structural diagram of a communications apparatus 1000. The communications apparatus 1000 may be a session management function network element, and can implement a function of the session management function network element in the methods provided in the embodiments of this application. Alternatively, the communications apparatus 1000 may be an apparatus that can support a session management function network element in implementing a function of the session management function network element in the methods provided in the embodiments of this application. The communications apparatus 1000 may be a hardware structure, a software module, or a combination of a hardware structure and a software module. The communications apparatus 1000 may be implemented by a chip system. In this embodiment of this application, the chip system may include a chip, or may include a chip and another discrete component.

The communications apparatus 1000 may include a processing unit 1001 and a transceiver unit 1002.

The processing unit 1001 may be configured to perform step S601 in the embodiment shown in FIG. 6A and FIG. 6B, or configured to perform step S702 in the embodiment shown in FIG. 7A, FIG. 7B, and FIG. 7C, and/or configured to support another process of the technology described in this specification.

The transceiver unit 1002 is configured to implement communication between the communications apparatus 1000 and another module, and may be a circuit, a component, an interface, a bus, a software module, a transceiver, or any other apparatus that can implement communication.

The transceiver unit 1002 may be configured to perform step S602 in the embodiment shown in FIG. 6A and FIG. 6B, or configured to perform step S701, step S703, and step S704 in the embodiment shown in FIG. 7A, FIG. 7B, and FIG. 7C, and/or configured to support another process of the technology described in this specification.

All related content of the steps in the foregoing method embodiments may be cited in function descriptions of the corresponding functional modules. Details are not described herein again.

Figure 11:
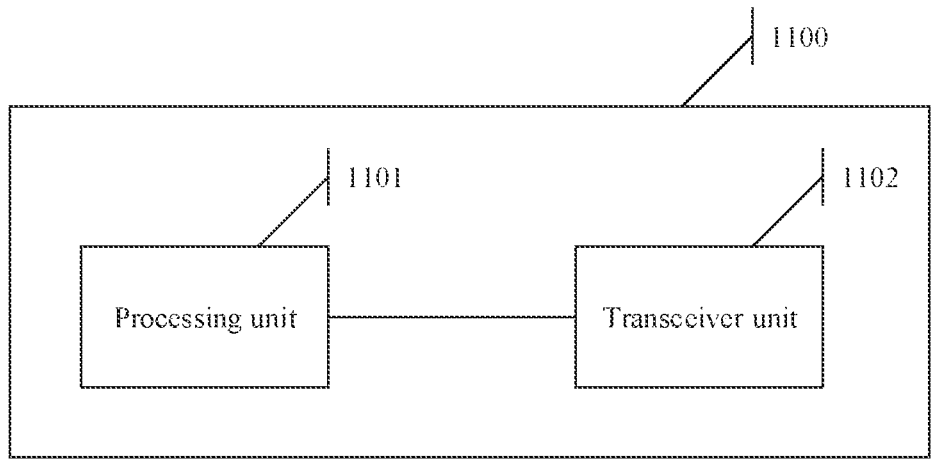
FIG. 11 is a schematic structural diagram of another communications apparatus according to an embodiment of this application.

FIG. 11 is a schematic structural diagram of a communications apparatus 1100. The communications apparatus 1100 may be a policy control function network element, and can implement a function of the policy control function network element in the methods provided in the embodiments of this application. Alternatively, the communications apparatus 1100 may be an apparatus that can support a policy control function network element in implementing a function of the policy control function network element in the methods provided in the embodiments of this application. The communications apparatus 1100 may be a hardware structure, a software module, or a combination of a hardware structure and a software module. The communications apparatus 1100 may be implemented by a chip system. In this embodiment of this application, the chip system may include a chip, or may include a chip and another discrete component.

The communications apparatus 1100 may include a processing unit 1101 and a transceiver unit 1102.

The processing unit 1101 may be configured to generate group policy information, where the group policy information is unknown MAC address self-learning policy information, and/or is configured to support another process of the technology described in this specification.

The transceiver unit 1102 is configured to implement communication between the communications apparatus 1100 and another module, and may be a circuit, a component, an interface, a bus, a software module, a transceiver, or any other apparatus that can implement communication.

The transceiver unit 1102 may be configured to communicate with the session management function network element shown in FIG. 6A and FIG. 6B, for example configured to perform step S701 in the embodiment shown in FIG. 7A, FIG. 7B, and FIG. 7C, and/or configured to support another process of the technology described in this specification.

All related content of the steps in the foregoing method embodiments may be cited in function descriptions of the corresponding functional modules. Details are not described herein again.

Figure 12:
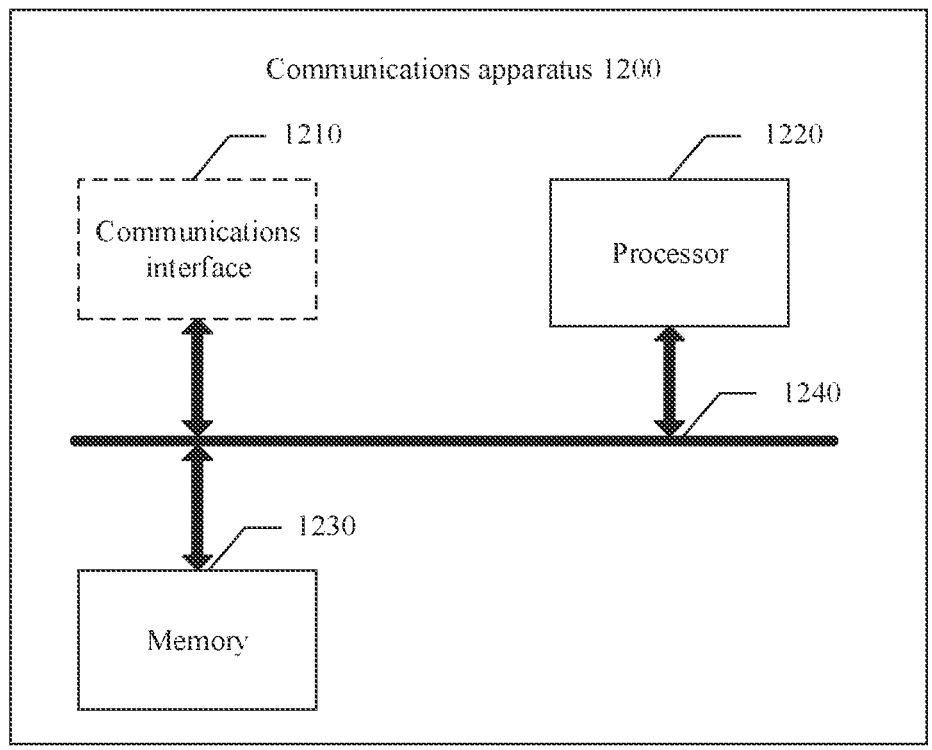
FIG. 12 is a schematic block diagram of a communications apparatus according to an embodiment of this application.

FIG. 12 shows a communications apparatus 1200 according to an embodiment of this application. The communications apparatus 1200 may be a first user plane function network element, and can implement a function of the first user plane function network element in the methods provided in the embodiments of this application. Alternatively, the communications apparatus 1200 may be an apparatus that can support a first user plane function network element in implementing a function of the first user plane function network element in the methods provided in the embodiments of this application. The communications apparatus 1200 may be a chip system. In this embodiment of this application, the chip system may include a chip, or may include a chip and another discrete component.

In hardware implementation, the foregoing transceiver unit 802 may be a transceiver, and the transceiver is integrated into the communications apparatus 1200 to form a communications interface 1210.

The communications apparatus 1200 includes at least one processor 1220 configured to implement or support the communications apparatus 1200 in implementing the function of the first user plane function network element in the methods provided in the embodiments of this application. For example, the processor 1220 may determine that a data packet matches a PDR of an N4 session of first UE, and determine that a source address of the data packet is an unknown MAC address. For details, refer to the detailed descriptions in the method example. Details are not described herein again.

The communications apparatus 1200 may further include at least one memory 1230 configured to store program instructions and/or data. The memory 1230 is coupled to the processor 1220. Coupling in this embodiment of this application is an indirect coupling or a communications connection between apparatuses, units, or modules, may be in an electrical, a mechanical, or another form, and is used for information exchange between the apparatuses, the units, or the modules. The processor 1220 may cooperate with the memory 1230. The processor 1220 may execute the program instructions stored in the memory 1230. At least one of the at least one memory may be included in the processor.

The communications apparatus 1200 may further include the communications interface 1210 configured to communicate with another device using a transmission medium, such that an apparatus used in the apparatus 1200 may communicate with the other device. For example, the other device may be a terminal. The processor 1220 may send and receive data through the communications interface 1210. The communications interface 1210 may be a transceiver.

A specific connection medium between the communications interface 1210, the processor 1220, and the memory 1230 is not limited in this embodiment of this application. In this embodiment of this application, the memory 1230, the processor 1220, and the communications interface 1210 are connected through a bus 1240 in FIG. 12. The bus is represented by a thick line in FIG. 12. A manner of connection between other components is only an example for description and is not limited thereto. The bus may be classified into an address bus, a data bus, a control bus, and the like. For ease of representation, only one thick line is used to represent the bus in FIG. 12, but this does not mean that there is only one bus or only one type of bus.

In this embodiment of this application, the processor 1220 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed using a combination of hardware in the processor and a software module.

In this embodiment of this application, the memory 1230 may be a non-volatile memory, for example, a hard disk drive (HDD) or a solid-state drive (SSD), or may be a volatile memory, for example, a random-access memory (RAM). The memory is any other medium that can be configured to carry or store expected program code in a form of instructions or a data structure and that can be accessed by a computer. However, the memory is not limited thereto. The memory in this embodiment of this application may alternatively be a circuit or any other apparatus that can implement a storage function, and is configured to store the program instructions and/or the data.

Figure 13:
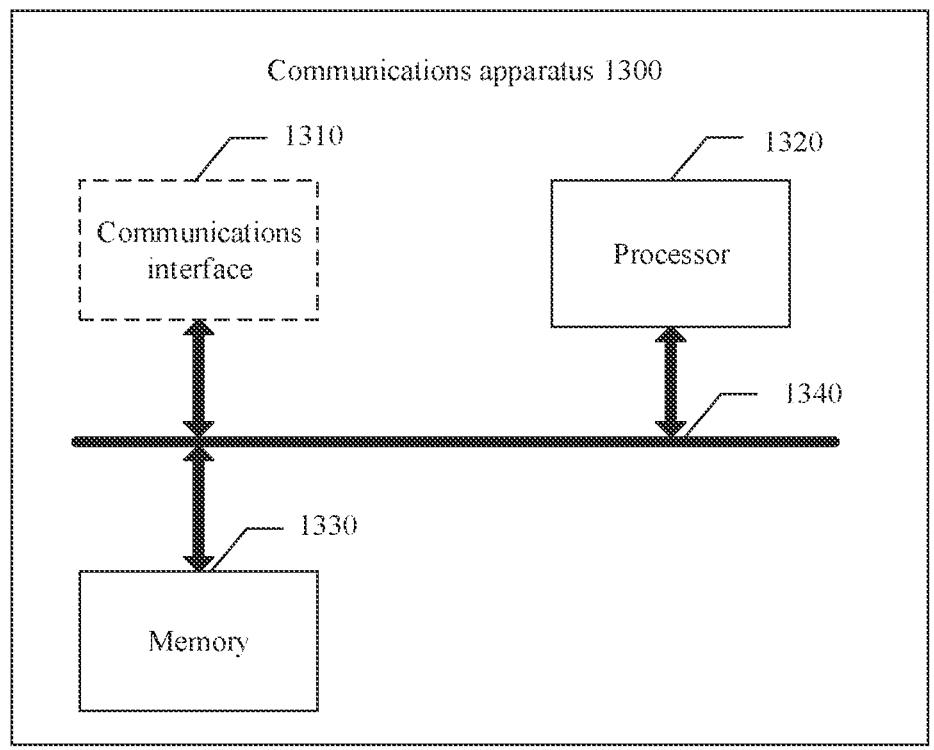
FIG. 13 is another schematic block diagram of a communications apparatus according to an embodiment of this application.

FIG. 13 shows a communications apparatus 1300 according to an embodiment of this application. The communications apparatus 1300 may be a second user plane function network element, and can implement a function of the second user plane function network element in the methods provided in the embodiments of this application. Alternatively, the communications apparatus 1300 may be an apparatus that can support a second user plane function network element in implementing a function of the second user plane function network element in the methods provided in the embodiments of this application. The communications apparatus 1300 may be a chip system. In this embodiment of this application, the chip system may include a chip, or may include a chip and another discrete component.

In hardware implementation, the foregoing transceiver unit 902 may be a transceiver, and the transceiver is integrated into the communications apparatus 1300 to form a communications interface 1310.

The communications apparatus 1300 includes at least one processor 1320 configured to implement or support the communications apparatus 1300 in implementing the function of the second user plane function network element in the methods provided in the embodiments of this application. For example, the processor 1320 may determine that a source MAC address of a replicated data packet is an unknown MAC address. For details, refer to the detailed descriptions in the method example. Details are not described herein again.

The communications apparatus 1300 may further include at least one memory 1330 configured to store program instructions and/or data. The memory 1330 is coupled to the processor 1320. Coupling in this embodiment of this application is an indirect coupling or a communications connection between apparatuses, units, or modules, may be in an electrical, a mechanical, or another form, and is used for information exchange between the apparatuses, the units, or the modules. The processor 1320 may cooperate with the memory 1330. The processor 1320 may execute the program instructions stored in the memory 1330. At least one of the at least one memory may be included in the processor.

The communications apparatus 1300 may further include the communications interface 1310 configured to communicate with another device using a transmission medium, such that an apparatus used in the apparatus 1300 may communicate with the other device. For example, the other device may be a terminal. The processor 1320 may send and receive data through the communications interface 1310. The communications interface 1310 may be a transceiver.

A specific connection medium between the communications interface 1310, the processor 1320, and the memory 1330 is not limited in this embodiment of this application. In this embodiment of this application, the memory 1330, the processor 1320, and the communications interface 1310 are connected through a bus 1340 in FIG. 13. The bus 1340 is represented by a thick line in FIG. 13. A manner of connection between other components is only an example for description and is not limited thereto. The bus 1340 may be classified into an address bus, a data bus, a control bus, and the like. For ease of representation, only one thick line is used to represent the bus in FIG. 13, but this does not mean that there is only one bus or only one type of bus.

In this embodiment of this application, the processor 1320 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed using a combination of hardware in the processor and a software module.

In this embodiment of this application, the memory 1330 may be a non-volatile memory, for example, a hard disk drive (HDD) or a solid-state drive (SSD), or may be a volatile memory, for example, a random-access memory (RAM). The memory is any other medium that can be configured to carry or store expected program code in a form of instructions or a data structure and that can be accessed by a computer. However, the memory is not limited thereto.

The memory in this embodiment of this application may alternatively be a circuit or any other apparatus that can implement a storage function, and is configured to store the program instructions and/or the data.

Figure 14:
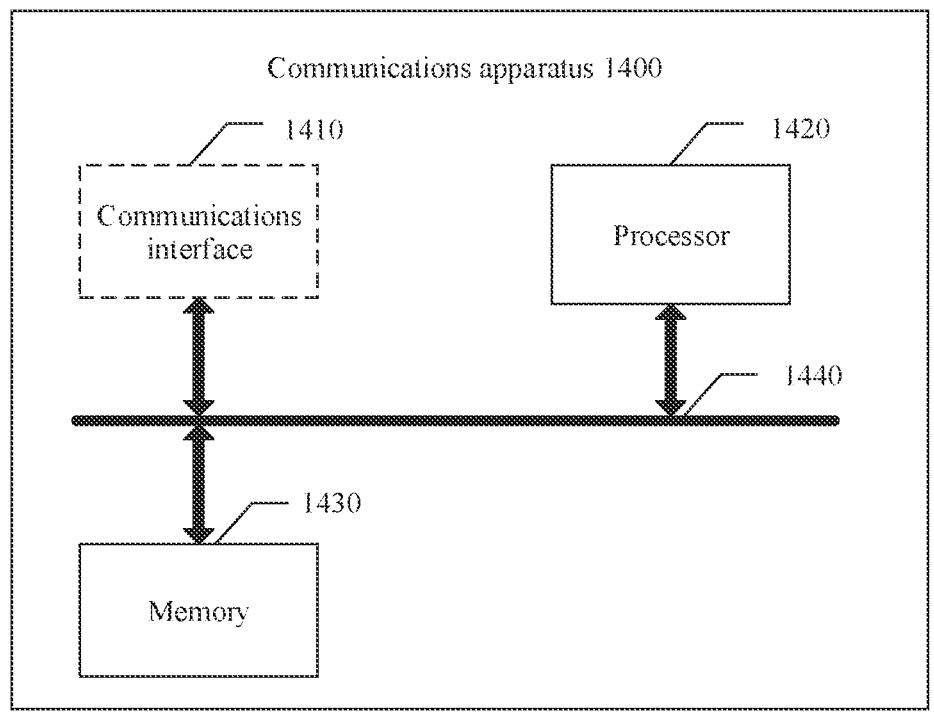
FIG. 14 is still another schematic block diagram of a communications apparatus according to an embodiment of this application.

FIG. 14 shows a communications apparatus 1400 according to an embodiment of this application. The communications apparatus 1400 may be a session management function network element, and can implement a function of the session management function network element in the methods provided in the embodiments of this application. Alternatively, the communications apparatus 1400 may be an apparatus that can support a session management function network element in implementing a function of the session management function network element in the methods provided in the embodiments of this application. The communications apparatus 1400 may be a chip system. In this embodiment of this application, the chip system may include a chip, or may include a chip and another discrete component.

In hardware implementation, the foregoing transceiver unit 1002 may be a transceiver, and the transceiver is integrated into the communications apparatus 1400 to form a communications interface 1410.

The communications apparatus 1400 includes at least one processor 1420 configured to implement or support the communications apparatus 1400 in implementing the function of the session management function network element in the methods provided in the embodiments of this application. For example, the processor 1420 may determine an unknown MAC address self-learning function of a first user plane function network element and an unknown MAC address self-learning function of a second user plane function network element based on group policy information. For details, refer to the detailed descriptions in the method example. Details are not described herein again.

The communications apparatus 1400 may further include at least one memory 1430 configured to store program instructions and/or data. The memory 1430 is coupled to the processor 1420. Coupling in this embodiment of this application is an indirect coupling or a communications connection between apparatuses, units, or modules, may be in an electrical, a mechanical, or another form, and is used for information exchange between the apparatuses, the units, or the modules. The processor 1420 may cooperate with the memory 1430. The processor 1420 may execute the program instructions stored in the memory 1430. At least one of the at least one memory may be included in the processor.

The communications apparatus 1400 may further include the communications interface 1410 configured to communicate with another device using a transmission medium, such that an apparatus used in the apparatus 1400 may communicate with the other device. For example, the other device may be a terminal. The processor 1420 may send and receive data through the communications interface 1410. The communications interface 1410 may be a transceiver.

A specific connection medium between the communications interface 1410, the processor 1420, and the memory 1430 is not limited in this embodiment of this application. In this embodiment of this application, the memory 1430, the processor 1420, and the communications interface 1410 are connected through a bus 1440 in FIG. 14. The bus 1140 is represented by a thick line in FIG. 14. A manner of connection between other components is only an example for description and is not limited thereto. The bus 1140 may be classified into an address bus, a data bus, a control bus, and the like. For ease of representation, only one thick line is used to represent the bus in FIG. 14, but this does not mean that there is only one bus or only one type of bus.

In this embodiment of this application, the processor 1420 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed using a combination of hardware in the processor and a software module.

In this embodiment of this application, the memory 1430 may be a non-volatile memory, for example, a hard disk drive (HDD) or a solid-state drive (SSD), or may be a volatile memory, for example, a random-access memory (RAM). The memory is any other medium that can be configured to carry or store expected program code in a form of instructions or a data structure and that can be accessed by a computer. However, the memory is not limited thereto. The memory in this embodiment of this application may alternatively be a circuit or any other apparatus that can implement a storage function, and is configured to store the program instructions and/or the data.

Figure 15:
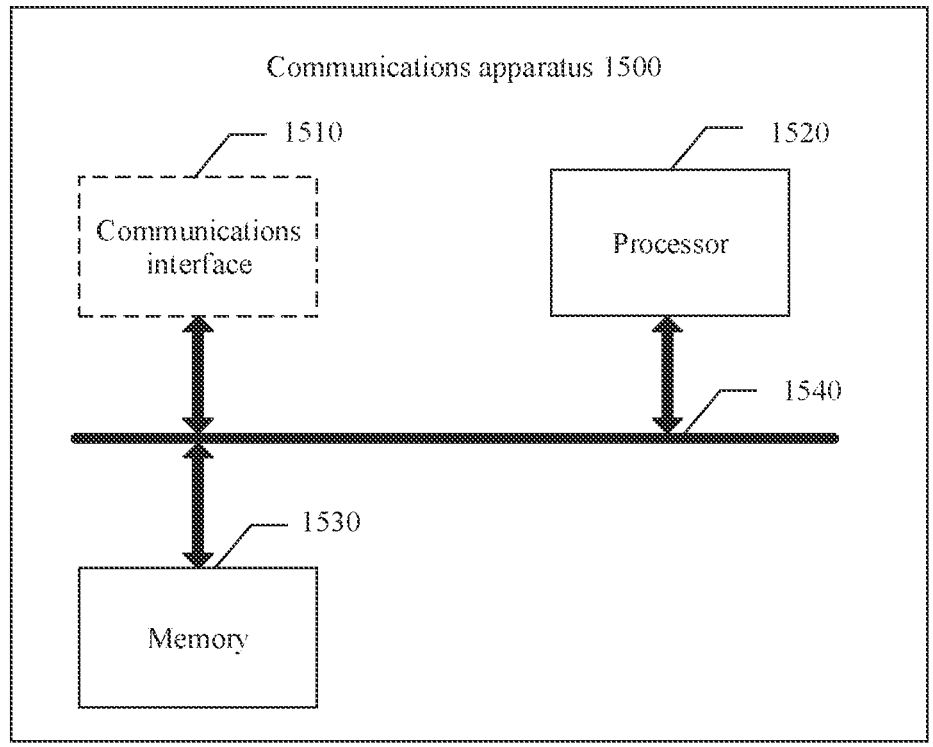
FIG. 15 is still another schematic block diagram of a communications apparatus according to an embodiment of this application.

FIG. 15 shows a communications apparatus 1500 according to an embodiment of this application. The communications apparatus 1500 may be a policy control function network element, and can implement a function of the policy control function network element in the methods provided in the embodiments of this application. Alternatively, the communications apparatus 1500 may be an apparatus that can support a policy control function network element in implementing a function of the policy control function network element in the methods provided in the embodiments of this application. The communications apparatus 1500 may be a chip system. In this embodiment of this application, the chip system may include a chip, or may include a chip and another discrete component.

In hardware implementation, the foregoing transceiver unit 1102 may be a transceiver, and the transceiver is integrated into the communications apparatus 1500 to form a communications interface 1510.

The communications apparatus 1500 includes at least one processor 1520 configured to implement or support the communications apparatus 1500 in implementing the function of the policy control function network element in the methods provided in the embodiments of this application. For example, the processor 1520 may determine group policy information. For details, refer to the detailed descriptions in the method example. Details are not described herein again.

The communications apparatus 1500 may further include at least one memory 1530 configured to store program instructions and/or data. The memory 1530 is coupled to the processor 1520. Coupling in this embodiment of this application is an indirect coupling or a communications connection between apparatuses, units, or modules, may be in an electrical, a mechanical, or another form, and is used for information exchange between the apparatuses, the units, or the modules. The processor 1520 may cooperate with the memory 1530. The processor 1520 may execute the program instructions stored in the memory 1530. At least one of the at least one memory may be included in the processor.

The communications apparatus 1500 may further include the communications interface 1510 configured to communicate with another device using a transmission medium, such that an apparatus used in the apparatus 1500 may communicate with the other device. For example, the other device may be a terminal. The processor 1520 may send and receive data through the communications interface 1510. The communications interface 1510 may be a transceiver.

A specific connection medium between the communications interface 1510, the processor 1520, and the memory 1530 is not limited in this embodiment of this application. In this embodiment of this application, the memory 1530, the processor 1520, and the communications interface 1510 are connected through a bus 1540 in FIG. 15. The bus 1540 is represented by a thick line in FIG. 15. A manner of connection between other components is only an example for description and is not limited thereto. The bus 1540 may be classified into an address bus, a data bus, a control bus, and the like. For ease of representation, only one thick line is used to represent the bus in FIG. 15, but this does not mean that there is only one bus or only one type of bus.

In this embodiment of this application, the processor 1520 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed using a combination of hardware in the processor and a software module.

In this embodiment of this application, the memory 1530 may be a non-volatile memory, for example, a hard disk drive (HDD) or a solid-state drive (SSD), or may be a volatile memory, for example, a random-access memory (RAM). The memory is any other medium that can be configured to carry or store expected program code in a form of instructions or a data structure and that can be accessed by a computer. However, the memory is not limited thereto. The memory in this embodiment of this application may alternatively be a circuit or any other apparatus that can implement a storage function, and is configured to store the program instructions and/or the data.

Figure 16:
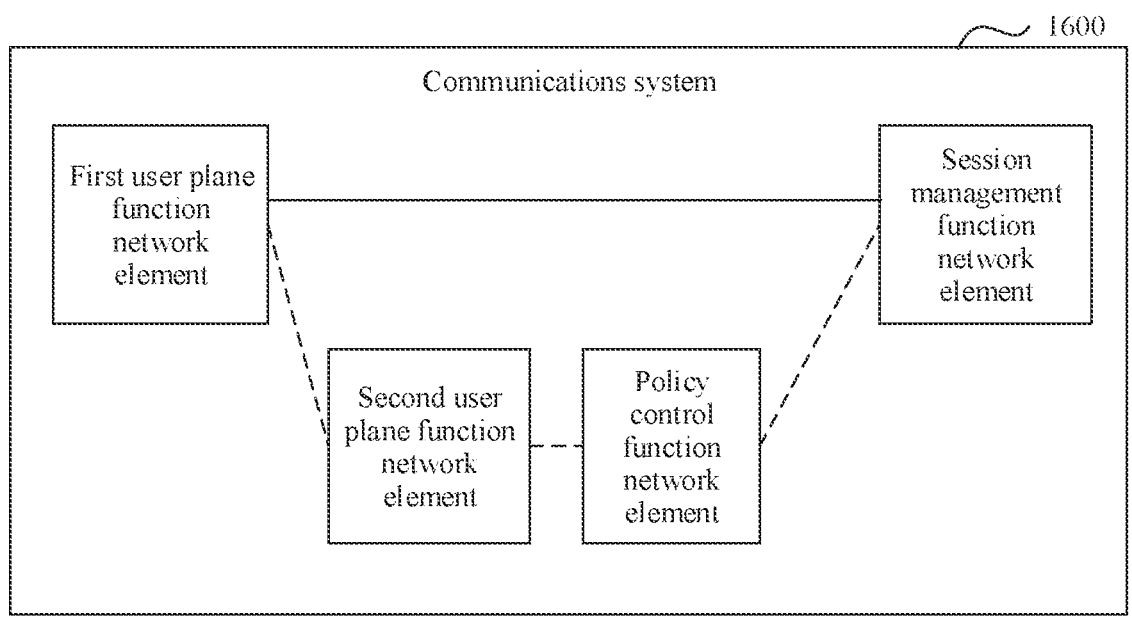
FIG. 16 is a schematic block diagram of a communications system according to an embodiment of this application.

For a schematic structural diagram of a communications system 1600 according to an embodiment of this application, refer to FIG. 16. For example, the communications system 1600 includes a first user plane function network element and a session management function network element, and optionally, further includes a second user plane function network element and/or a policy control function network element.

The first user plane function network element, the second user plane function network element, the session management function network element, and the policy control function network element are respectively configured to implement functions of related network elements in FIG. 6A and FIG. 6B or FIG. 7A, FIG. 7B, and FIG. 7C. For details, refer to the related descriptions in the method embodiments. Details are not described herein again.

An embodiment of this application further provides a computer-readable storage medium, including instructions. When the instructions are run on a computer, the computer is enabled to perform the methods performed by the first user plane function network element, the second user plane function network element, the session management function network element, and the policy control function network element in FIG. 6A and FIG. 6B or FIG. 7A, FIG. 7B, and FIG. 7C.

An embodiment of this application further provides a computer program product, including instructions. When the instructions are run on a computer, the computer is enabled to perform the methods performed by the first user plane function network element, the second user plane function network element, the session management function network element, and the policy control function network element in FIG. 6A and FIG. 6B or FIG. 7A, FIG. 7B, and FIG. 7C.

An embodiment of this application provides a chip system. The chip system includes a processor, and may further include a memory configured to implement functions of the first user plane function network element, the second user plane function network element, the session management function network element, and the policy control function network element in the foregoing methods. The chip system may include a chip, or may include a chip and another discrete component.

All or some of the foregoing methods in the embodiments of this application may be implemented using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD), or the like.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A routing rule management method, comprising:
    receiving, by a first user plane function network element through a protocol data unit (PDU) session, a first data packet from a terminal, wherein a first source address of the first data packet is a first address;
    generating, by the first user plane function network element when the first address is an unknown media access control (MAC) address, a first routing rule corresponding to the PDU session, wherein the first routing rule is configured to forward, to the PDU session, a data packet sent to the first address;
    generating, by the first user plane function network element, a second data packet, wherein a second source address of the second data packet is the first address, and wherein a destination address of the second data packet is a broadcast address or a multicast address; and
    forwarding, by the first user plane function network element, the second data packet and MAC address self-learning indication information to an internal interface of the first user plane function network element.

2. The routing rule management method according to claim 1, wherein the first routing rule comprises at least one of a first packet detection rule (PDR) or a first forwarding action rule (FAR), wherein the first PDR is configured to detect the data packet sent to the first address, wherein the first FAR comprises tunnel information of the PDU session, and wherein the tunnel information of the PDU session is set on an access network side or on an intermediate user plane function network element side.

3. The routing rule management method according to claim 2, wherein the first FAR further comprises a quality of service (QOS) flow identifier (QFI), and wherein the QFI is set to a QoS flow to which the first data packet belongs.

4. The routing rule management method according to claim 1, wherein after generating the first routing rule corresponding to the PDU session, the routing rule management method further comprises:
    receiving, by the first user plane function network element, the second data packet and the MAC address self-learning indication information through the internal interface of the first user plane function network element;
    replicating, by the first user plane function network element, the second data packet; and
    sending, by the first user plane function network element, a replicated data packet and the MAC address self-learning indication information to at least one other user plane function network element.

5. The routing rule management method according to claim 4, wherein replicating the second data packet comprises:
    determining, by the first user plane function network element, a second forwarding action rule (FAR) associated with a second packet detection rule (PDR) matching the second data packet, wherein the second FAR comprises a replication label; and
    replicating, by the first user plane function network element, the second data packet based on the replication label,
    wherein the second FAR comprises a forwarding indication, wherein the forwarding indication comprises information about a tunnel between the first user plane function network element and each of the at least one other user plane function network element, and wherein sending the replicated data packet comprises sensing the replicated data packet to each of the at least one other user plane function network element based on the forwarding indication.

6. The routing rule management method according to claim 4, wherein replicating the second data packet comprises replicating, by the first user plane function network element, the second data packet after determining that the second source address of the second data packet is not a known MAC address, and wherein sending the replicated data packet to the at least one other user plane function network element comprises:
  determining, by the first user plane function network element after determining that the second source address of the second data packet is not the known MAC address, information about a tunnel between the first user plane function network element and each of the at least one other user plane function network element based on an external tunnel associated with an N4 session of a $5^{th}$ generation (5G) local area network group to which the terminal belongs; and
  sending, by the first user plane function network element, the replicated data packet to each of the at least one other user plane function network element based on the information about the tunnel.

7. The routing rule management method according to claim 4, wherein the MAC address self-learning indication information instructs each of the at least one other user plane function network element to learn the first address in the replicated data packet and then discard the replicated data packet, and wherein the MAC address self-learning indication information is in tunnel header information of the replicated data packet.

8. The routing rule management method according to claim 1, further comprising receiving, by the first user plane function network element, a first indication from a session management function network element, wherein the first indication is configured to one of indicate to the first user plane function network element to self-learn unknown MAC addresses, or activate an unknown MAC address self-learning function of the first user plane function network element.

9. A routing rule management method, comprising:
  receiving, by a session management function network element, a protocol data unit (PDU) session creation request for a terminal, wherein the PDU session creation request comprises a data network name (DNN);
  determining, by the session management function network element, that the DNN is associated with a $5^{th}$ generation (5G) local area network (LAN) group;
  determining, based on group policy information of the 5G LAN group, to enable an unknown MAC address self-learning function;
  determining, based on a prestored correspondence between the 5G LAN group and a plurality of user plane function network elements, a first user plane function network element and a second user plane function network element included in the 5G LAN group;
  sending, by the session management function network element, a first indication to the first user plane function network element anchored by the PDU session; and
  sending, by the session management function network element, the first indication to the second user plane function network element anchored by the PDU session,
  wherein the first indication is configured to one of indicate to a user plane function network element to self-learn a media access control (MAC) address, or activate a MAC address self-learning function of the user plane function network element.

10. The routing rule management method according to claim 9, further comprising generating, by the session management function network element, the first indication based on at least one of a local configuration or group policy information that is from a policy control function network element, wherein the group policy information is unknown MAC address self-learning policy information, and wherein the local configuration instructs the user plane function network element to perform MAC address self-learning.

11. The routing rule management method according to claim 9, further comprising sending, by the session management function network element when the user plane function network element provides a service for the 5G LAN group for a first time, an N4 session creation request corresponding to the 5G LAN group to the user plane function network element.

12. The routing rule management method according to claim 11, wherein the first indication is carried in the N4 session creation request corresponding to at least one of the 5G LAN group or another N4 session creation request corresponding to the PDU session.

13. A communications apparatus, comprising:
  at least one processor; and
  a memory coupled to the processor and configured to store program instructions, which when executed by the at least one processor, cause the communications apparatus to:
    receive a first data packet from a terminal through a protocol data unit (PDU) session, wherein a first source address of the first data packet is a first address;
    generate a first routing rule corresponding to the PDU session when the first address is an unknown media access control (MAC) address, wherein the first routing rule is configured to forward, to the PDU session, a data packet sent to the first address;
    generate a second data packet, wherein a second source address of the second data packet is the first address, and wherein a destination address of the second data packet is a broadcast address or a multicast address; and
    forward the second data packet and MAC address self-learning indication information to an internal interface of the communications apparatus.

14. The communications apparatus according to claim 13, wherein the first routing rule comprises at least one of a first packet detection rule (PDR) or a first forwarding action rule (FAR), wherein the first PDR is configured to detect the data packet sent to the first address, wherein the first FAR comprises tunnel information of the PDU session, and wherein the tunnel information of the PDU session is set on an access network side or on an intermediate user plane function network element side.

15. The communications apparatus according to claim 14, wherein the first FAR further comprises a quality of service (QOS) flow identifier (QFI), and wherein the QFI is set to a QoS flow to which the first data packet belongs.

16. The communications apparatus according to claim 13, wherein the program instructions further cause the communications apparatus to:
  receive the second data packet and the MAC address self-learning indication information through the internal interface of a first user plane function network element;
  replicate the second data packet; and
  send a replicated data packet and the MAC address self-learning indication information to at least one other user plane function network element.

17. The communications apparatus according to claim 16, wherein the program instructions cause the communications apparatus to:
  determine a second forwarding action rule (FAR) associated with a second packet detection rule (PDR) matching the second data packet, wherein the second FAR comprises a replication label;
replicate the second data packet based on the replication label; and
send the replicated data packet to each of the at least one other user plane function network element based on a forwarding indication, wherein the second FAR comprises the forwarding indication, and wherein the forwarding indication comprises information about a tunnel between the first user plane function network element and each of the at least one other user plane function network element.

18. The communications apparatus according to claim 16, wherein the program instructions cause the communications apparatus to:
replicate the second data packet after determining that the second source address of the second data packet is not a known MAC address;
determine information about a tunnel between the first user plane function network element and each of the at least one other user plane function network element based on an external tunnel associated with an N4 session of a $5^{th}$ generation (5G) local area network group to which the terminal belongs; and
send the replicated data packet and the MAC address self-learning indication information to each of the at least one other user plane function network based on the information about the tunnel.

19. The communications apparatus according to claim 16, wherein the MAC address self-learning indication information instructs each of the at least one other user plane function network element to learn the first address in the replicated data packet and then discard the replicated data packet, and wherein the MAC address self-learning indication information is in tunnel header information of the replicated data packet.

20. The communications apparatus according to claim 13, wherein the program instructions cause the communications apparatus to receive a first indication from a session management function network element, wherein the first indication is configured to one of indicate to the communications apparatus to self-learn unknown MAC addresses, or activate an unknown MAC address self-learning function of the communications apparatus.

* * * * *